United States Patent
Brooker et al.

(10) Patent No.: US 9,767,445 B1
(45) Date of Patent: Sep. 19, 2017

(54) STATISTICALLY COST-FOLLOWING ACCOUNTING MODEL

(71) Applicant: Amazon Technologies, Inc., Reno, NV (US)

(72) Inventors: Marc J. Brooker, Cape Town (ZA); David Brown, Sunnydale (ZA); Eric Jason Brandwine, Haymarket, VA (US); Marvin M. Theimer, Bellevue, WA (US); Abhinav Agrawal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 499 days.

(21) Appl. No.: 14/109,852

(22) Filed: Dec. 17, 2013

Related U.S. Application Data

(62) Division of application No. 13/045,200, filed on Mar. 10, 2011, now Pat. No. 8,639,595.

(51) Int. Cl.
| | |
|---|---|
| *G07B 17/00* | (2006.01) |
| *G07F 19/00* | (2006.01) |
| *H04M 15/00* | (2006.01) |
| *G06Q 20/14* | (2012.01) |
| *G06Q 30/04* | (2012.01) |

(52) U.S. Cl.
CPC .......... *G06Q 20/145* (2013.01); *G06Q 30/04* (2013.01)

(58) Field of Classification Search
None
See application file for complete search history.

(56) References Cited

U.S. PATENT DOCUMENTS

| | | | |
|---|---|---|---|
| 5,996,013 A | 11/1999 | Delp et al. | |
| 6,212,389 B1 * | 4/2001 | Fapojuwo | H04W 36/04 455/436 |
| 6,968,323 B1 | 11/2005 | Bansal et al. | |
| 7,433,311 B1 | 10/2008 | Kalyanasundaram et al. | |

(Continued)

FOREIGN PATENT DOCUMENTS

WO  2012050772  4/2012

OTHER PUBLICATIONS

U.S. Appl. No. 13/045,200 , "Non-Final Office Action", Jul. 16, 2012, 21 pages.

(Continued)

*Primary Examiner* — Ariel Yu
(74) *Attorney, Agent, or Firm* — Kilpatrick Townsend & Stockton LLP

(57) ABSTRACT

Techniques, including systems and methods, for virtual resource cost tracking account for unused capacity of implementation resources that are dedicated to particular customers and, as a result, are unusable for maintaining virtual resources for other customers. Customers requesting dedicated use of implementation resources are charged in a manner that compensates the virtual resource provider for the lost ability to use unused capacity of implementation resources to serve other customers. Customer charges may be determined by a pricing function that is calculated such that, for a base of customers, expected revenue from the base of customers approximates a revenue goal. The revenue goal may be determined based on revenue that would have been expected had the unused capacity of the dedicated implementation resources been available for serving other customers.

18 Claims, 17 Drawing Sheets

(56) References Cited

U.S. PATENT DOCUMENTS

| | | | |
|---|---|---|---|
| 7,522,036 B1* | 4/2009 | Preuss | H05K 7/1457 |
| | | | 307/150 |
| 7,610,225 B2* | 10/2009 | O'Neill | G06Q 20/102 |
| | | | 379/114.06 |
| 8,473,615 B1 | 6/2013 | Rowland et al. | |
| 8,484,355 B1 | 7/2013 | Lochhead et al. | |
| 8,843,624 B2 | 9/2014 | Britsch et al. | |
| 2002/0156828 A1 | 10/2002 | Ishizaki et al. | |
| 2004/0221038 A1 | 11/2004 | Clarke, Jr. et al. | |
| 2005/0131993 A1 | 6/2005 | Fatula | |
| 2006/0075079 A1 | 4/2006 | Powers et al. | |
| 2006/0143495 A1 | 6/2006 | Bozak et al. | |
| 2006/0190602 A1 | 8/2006 | Canali et al. | |
| 2006/0212334 A1 | 9/2006 | Jackson | |
| 2007/0067435 A1 | 3/2007 | Landis et al. | |
| 2007/0105574 A1* | 5/2007 | Gupta | H04W 72/0406 |
| | | | 455/509 |
| 2007/0105575 A1* | 5/2007 | Sampath | H04W 52/243 |
| | | | 455/509 |
| 2007/0105576 A1* | 5/2007 | Gupta | H04W 52/243 |
| | | | 455/509 |
| 2007/0201361 A1 | 8/2007 | Kumar et al. | |
| 2008/0126547 A1 | 5/2008 | Waldspurger et al. | |
| 2008/0216082 A1 | 9/2008 | Eilam et al. | |
| 2008/0320242 A1 | 12/2008 | Jelinek et al. | |
| 2009/0019535 A1 | 1/2009 | Mishra et al. | |
| 2009/0157870 A1 | 6/2009 | Nakadai | |
| 2009/0164356 A1 | 6/2009 | Bakman | |
| 2009/0271324 A1 | 10/2009 | Jandhyala et al. | |
| 2009/0271472 A1 | 10/2009 | Scheifler et al. | |
| 2009/0276771 A1 | 11/2009 | Nickolov et al. | |
| 2010/0036957 A1 | 2/2010 | Patel et al. | |
| 2010/0144363 A1 | 6/2010 | De Rosa et al. | |
| 2010/0169490 A1 | 7/2010 | McNair | |
| 2010/0186010 A1 | 7/2010 | Chalemin et al. | |
| 2010/0192212 A1 | 7/2010 | Raleigh | |
| 2010/0223364 A1 | 9/2010 | Wei | |
| 2010/0223383 A1 | 9/2010 | Salevan et al. | |
| 2010/0250744 A1 | 9/2010 | Hadad et al. | |
| 2010/0306773 A1 | 12/2010 | Lee et al. | |
| 2011/0055034 A1* | 3/2011 | Ferris | G06Q 30/0283 |
| | | | 705/26.1 |
| 2011/0119104 A1 | 5/2011 | Levine et al. | |
| 2011/0145412 A1 | 6/2011 | Ford et al. | |
| 2011/0252420 A1 | 10/2011 | Tung et al. | |
| 2011/0295727 A1 | 12/2011 | Ferris et al. | |
| 2011/0310757 A1 | 12/2011 | Yokoyama et al. | |
| 2012/0084113 A1 | 4/2012 | Brandwine et al. | |
| 2012/0084443 A1 | 4/2012 | Theimer et al. | |

OTHER PUBLICATIONS

U.S. Appl. No. 13/045,200 , "Notice of Allowance", Aug. 30, 2013, 12 pages.
U.S. Appl. No. 13/045,200 , "Office Action", Feb. 8, 2013, 6 pages.
U.S. Appl. No. 13/045,200, filed Mar. 10, 2011, Titled: Statistically Cost-Following Accounting Model for Dedicated Resources.

* cited by examiner

| Dedicated Virtual Computer System Pricing: | | | |
|---|---|---|---|
| US-Region I | US-Region II | Ukraine | Russia |

| Standard Dedicated Instances | ACME OS | ACE OS |
|---|---|---|
| Small | $1.11/hour | $1.23/hour |
| Medium | $2.34/hour | $3.14/hour |
| Large | $3.67/hour | $4.56/hour |

| Super Dedicated Instances | ACME OS | ACE OS |
|---|---|---|
| Small | $2.34/hour | $2.65/hour |
| Medium | $4.65/hour | $5.12/hour |
| Large | $7.01/hour | $9.02/hour |

| Big Memory Dedicated Instances | ACME OS | ACE OS |
|---|---|---|
| Small | $3.00/hour | $3.14/hour |

Dedicated Virtual Computer System Pricing:

| US-Region I | US-Region II | Ukraine | Russia |
|---|---|---|---|

2100

| Standard Dedicated Instances with ACME OS | |
|---|---|
| Small | $0.25/hour + $0.86/hour surcharge |
| Medium | $1.64/hour + $0.70/hour surcharge |
| Large | $2.87/hour + $0.60/hour surcharge |

◁ 2102

| Super Dedicated Instances with ACME OS | |
|---|---|
| Small | $1.39/hour + $0.95/hour surcharge |
| Medium | $3.77/hour + $0.88/hour surcharge |
| Large | $6.76/hour + $0.25/hour surcharge |

◁ 2102

| Big Memory Dedicated Instances with ACME OS | |
|---|---|
| Small | $2.50/hour + $0.50/hour surcharge |

*Figure 21*

Dedicated Virtual Computer System Surcharge Pricing:

| US-Region I | US-Region II | Ukraine | Russia |
|---|---|---|---|

2200

| Small Standard Dedicated Instances with ACME OS | |
|---|---|
| First 10 Instances | $1.24/hour per instance per hour |
| Next 100 Instances | $0.99/hour per instance per hour |
| Next 200 Instances | $0.72/hour per instance per hour |
| Next 500 Instances | $0.33/hour per instance per hour |
| Over 810 Instances | $0.08/hour per instance per hour |

◁ 2202

| Small Super Dedicated Instances with ACME OS | |
|---|---|
| First 10 Instances | $1.99/hour per instance per hour |
| Next 100 Instances | $1.24/hour per instance per hour |
| Next 200 Instances | $0.88/hour per instance per hour |

STATISTICALLY COST-FOLLOWING ACCOUNTING MODEL

CROSS REFERENCE TO RELATED APPLICATIONS

This application is a divisional of prior U.S. application Ser. No. 13/045,200, filed on Mar. 10, 2011, titled "Statistically Cost-Following Accounting Model for Dedicated Resources," the contents of which is hereby incorporated in its entirety by reference. This application also incorporates by reference for all purposes the full disclosure of application Ser. No. 12/894,883, entitled "Virtual Resource Cost Tracking With Dedicated Implementation Resources" filed on Sep. 30, 2010.

BACKGROUND

It has become common for individuals and organizations of various kinds to use computers to perform and/or assist with a wide variety of tasks. Rather than purchasing and maintaining physical computers, it is becoming more and more common to provision virtual computer systems, and other virtual computing resources of various kinds, with a specialized provider of such virtual resources. From a point of view of a customer of a virtual resource provider, the use of virtual computing resources can have a variety of advantages such as cost-efficiency and timely response to changing computing needs. However, conventional virtual resource providers have various shortcomings.

Virtual resource providers may manage large fleets of physical computers including relatively high capacity computers each capable of hosting multiple virtual computer systems. Virtual resource providers can use a variety of methods for assigning virtual computer systems to physical host computers. At some conventional virtual resource providers, a particular virtual computer system provisioned for one customer may share a high capacity computer with virtual computer systems associated with multiple other customers. Such sharing may be unacceptable to one or more of the customers for a variety of reasons including regulatory requirements, organizational policies and/or perceived data security risk. Some conventional virtual resource providers attempt to prevent unacceptable sharing with methods that are detrimental to virtual resource provider effectiveness, to efficiency (including cost-efficiency) and/or to other virtual resource provider advantages, from a customer point of view and/or from a provider point of view.

BRIEF DESCRIPTION OF THE DRAWINGS

Various embodiments in accordance with the present disclosure will be described with reference to the drawings, in which:

FIG. 20 is an illustrative example of a presentation of pricing information generated in accordance with at least one embodiment;

FIG. 21 is another illustrative example of a presentation of pricing information generated in accordance with at least one embodiment; and FIG. 22 is another illustrative example of a presentation of pricing information generated in accordance with at least one embodiment.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
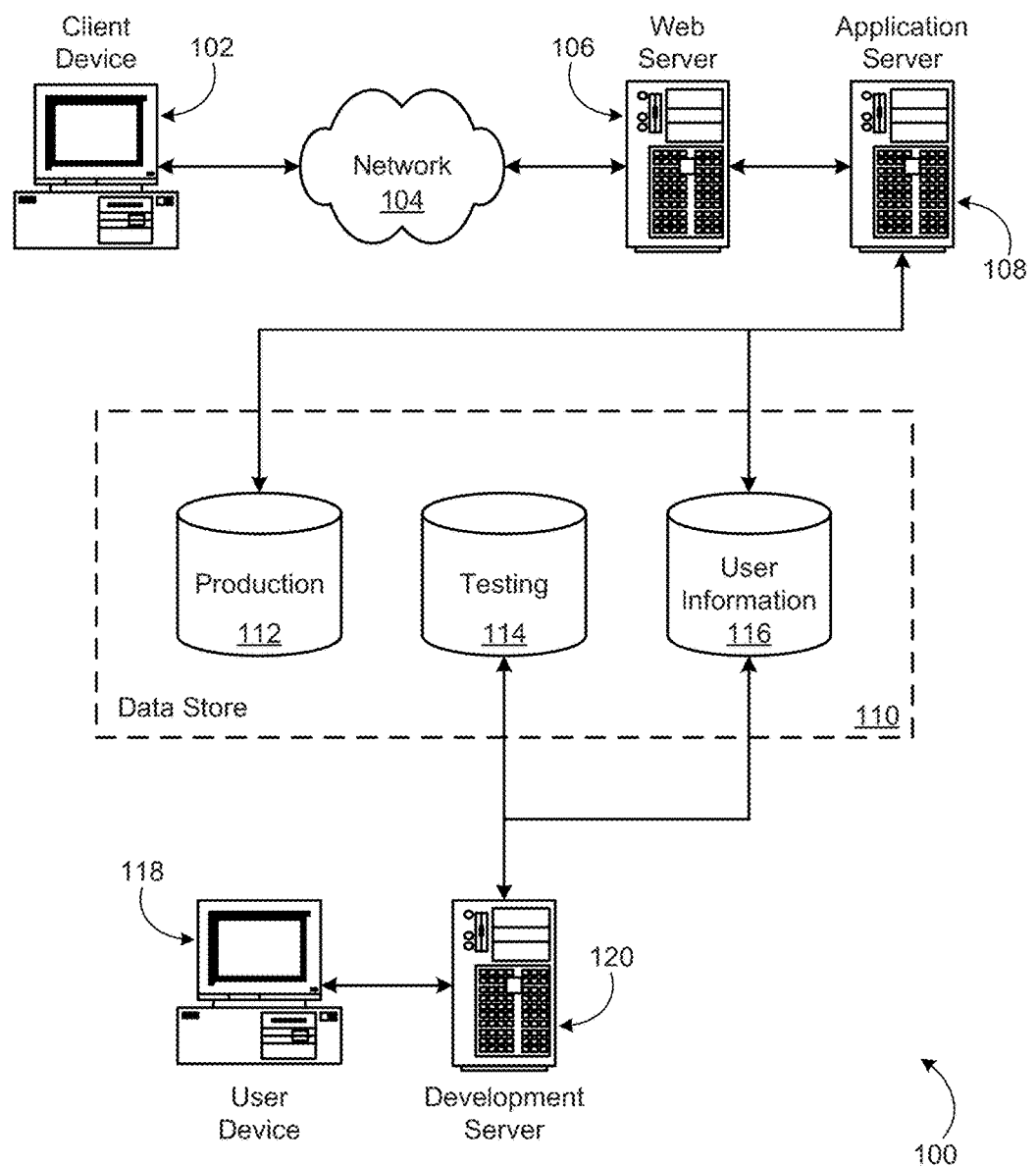
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, virtual resources may be provisioned in a manner that is aware of, and respects, underlying implementation resource boundaries. A virtual resource provider may provision each of a variety of types of virtual resource (e.g., virtual computer systems, virtual data stores, virtual network connections) with a particular set of implementation resources (e.g., data center space, physical server computers, networking hardware). At least some of the implementation resources may be capable of participating in the implementation of multiple virtual resource instances, each potentially associated with a different customer of the virtual resource provider. In at least one embodiment, a set of customers (i.e., one or more customers) of the virtual resource provider may specify that particular virtual resources are to be implemented with implementation resources that are dedicated to the set of customers (i.e., implemented with "dedicated implementation resources"), and/or that particular implementation resources utilized to implement virtual resources of the set of customers are to be dedicated implementation resources. In other words, each customer of a set of customers may specify that implementation resources used to implement the customer's virtual resources are to be used exclusively for the customer's virtual resources and that unused capacity, if any, of any dedicated implementation resource is not to be used for virtual resources of another customer.

Implementation resource boundaries (e.g., physical separation boundaries) may correspond to information barriers (e.g., barriers to unintended information transfer and/or unauthorized data modification). Accordingly, dedicating an implementation resource to a particular set of customers of a virtual resource provider (thereby excluding other customers from the implementation resource) may establish one or more information barriers between the particular set of customers and other customers of the virtual resource provider (i.e., may place the particular set of customers "behind" the one or more information barriers). Alternatively, or in addition, dedication of implementation resources can improve virtual resource performance, for example, at least in part by reducing unanticipated implementation resource contention. As a further alternative, or further in addition, dedication of implementation resources can improve virtual resource fault tolerance, for example, by isolating virtual resources from operation faults that occur at other implementation resources.

The virtual resource provider may maintain a general implementation resource pool containing implementation resources from which no customer of the virtual resource provider is excluded. The virtual resource provider may furthermore maintain one or more dedicated implementation resource pools containing implementation resources dedicated to one or more sets of customers of the virtual resource provider. Each dedicated implementation resource pool may have an associated set of entry and/or exit procedures (collectively "transition procedures") such as implementation resource configuration including access configuration, storage medium formatting, and secure data erase. Implementation resources in a dedicated pool may be active or inactive (i.e., actively participating in implementing one or more virtual resources or idle). The virtual resource provider may monitor activity levels in dedicated implementation resource pools and transition implementation resources from and to the generation implementation resource pool to maintain target inactive to active implementation resource ratios and/or inactive implementation resource "buffers" with sizes based at least in part on forecast changes (e.g., rates of change) in activity levels.

There may be various costs, including financial costs, associated with providing virtual resources to customers, and such costs may be presented to customers of the virtual resource provider. Costs may be presented in terms of virtual resource availability per unit time (e.g., a monthly or hourly cost for each virtual computer system provisioned to a customer), in terms of units of data (e.g., gigabytes) processed, stored and/or transferred, and/or in terms of units of implementation resource actively utilized to implement virtual resources and/or made unavailable to others. Costs corresponding to active and inactive implementation resources in a particular dedicated pool associated with a particular set of customers may be presented to those customers as separate active and inactive amounts in a cost statement. Alternatively, a single amount may be presented to the customers based at least in part on the costs corresponding to maintaining the active and inactive implementation resources in the particular dedicated pool. As another alternative, a single amount may be presented to the customers based at least in part on the costs corresponding to maintaining the active and inactive implementation resources for the virtual resource provider as a whole. In at least one embodiment, customers of the virtual resource provider may mitigate costs associated with implementation resources in dedicated pools by reserving virtual resource instances and/or associated dedicated implementation resources.

In at least one embodiment, implementation resources are apportionable among a plurality of resource allocation units. Virtual resources may correspond to a number of resource allocation units of an implementation resource. A hardware server, for example, may be able to maintain a number of standard virtual computer systems offered by a virtual resource provider. Each standard virtual computer system may correspond to a resource allocation unit of the server. Some virtual resources may correspond to multiple resource allocation units. For example, a virtual computer system having, in one or more respects, increased performance over a standard virtual computer system, may correspond to multiple resource allocation units due to the increased hardware capacity necessary for operating the virtual computer system with higher performance. When using dedicated implementation resources, a customer may use less than all of the resource allocation units dedicated to the customer. Continuing the example of this paragraph, a customer using a dedicated hardware server to maintain a single standard virtual computer system may leave resource allocation units of the dedicated hardware server unused since the dedicated hardware server could be used to maintain additional resource allocation units for the customer or for other customers. Accordingly, resource allocation units of an implementation resource that are used by a customer may be referred to as active resource allocation units and resource allocation units of an implementation resource that are unused by a customer may be referred to as inactive resource allocation units.

By allowing customers to utilize dedicated implementation resources, a virtual resource provider loses the ability to use inactive portions of implementation resources (inactive resource allocation units) to serve customers to whom the inactive implementation resources are not dedicated. Accordingly, the costs presented to customers may compensate for revenue not achieved due to the dedication of inactive resource allocation units. In at least one embodiment, costs are calculated based at least in part on past customer usage of dedicated implementation resources for a customer base. The costs may be calculated in a manner such that, collectively, the costs presented to the customer base compensate for potential revenue forfeited by dedicating inactive resource allocation units. The costs may be calculated, for example, such that, in aggregate, the customers base is charged as if, for a time period, all of the inactive resource allocation units were used by customers paying a standard price per resource allocation unit. The customer base may be, in aggregate, charged a smaller amount or a larger amount.

In an embodiment, a pricing function is determined based at least in part on past customer usage of dedicated implementation resources by a base of customers. The pricing function may be used to determine a charge for each customer based at least in part on the amount of resource allocation units a customer uses and the amount of time the resource allocation units are used. The charge may be, for example, a surcharge per resource allocation unit per hour, although surcharges may be used for other granularities of usage. In an embodiment, the pricing function is a per hour (or other time period) surcharge with input being a number of resource allocation units used by a customer. The pricing function may be calculated to compensate for potential revenue forfeited by dedicating unused resource allocation units.

In an embodiment, the pricing function is calculated to be nonlinear over its entire domain (which may be positive integers), although in various embodiments the pricing function may be linear for portions of its domain. The pricing function may be calculated, for example, may be a positive but decreasing function. The pricing function may monotonically decrease so that larger resource allocation unit usages by a customer correspond to smaller per-resource allocation unit surcharges. In this manner, because customers using larger numbers of resource allocation units on dedicated implementation resources utilize the resource allocation units more efficiently than customers utilizing smaller numbers of resource allocation units, customers using larger numbers of resource allocation units are rewarded for their efficient usage. At the same time, inefficient usage of dedicated implementation resources by customers using fewer allocation units on dedicated implementation resources is discouraged, but still available for those customers for whom such usage may be necessary or at least worth the additional cost.

In various embodiments, a pricing function may be used to define one or more pricing tiers. The tiers may be based at least in part on customer usage of resource allocation units on dedicated implementation resources. In other words, customers fall into certain tiers based at least in part on the amount of resource allocation units the customers use. The price for each tier may be based at least in part on the pricing function. The price for each tier may be determined, for example, such that the customers falling in the tier are, in aggregate, charged as if the pricing function was applied to each customer's use individually. In this manner, the customers are charged approximately what they would have been charged had the pricing function been applied individually, but the customers are charged according to a scheme that is simpler to understand since the customers can estimate their costs simply by determining which tier they likely fall into. Customers' past utilization of resources, including dedicated resources, may be used to calculate pricing tiers into which the customers would be expected to fall.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
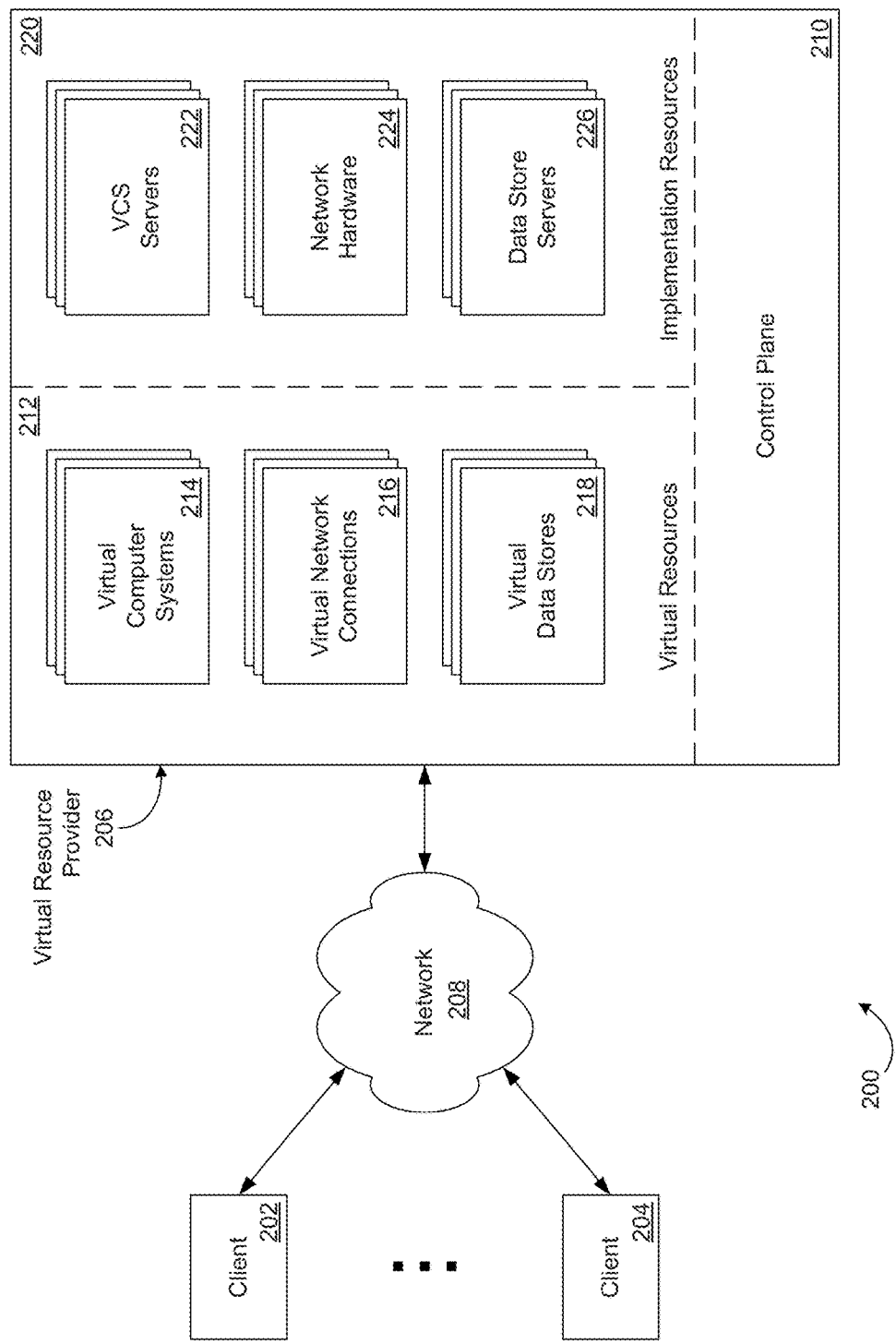
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or those described in more detail below with reference to FIG. 3, FIG. 4, FIG. 5 and FIG. 6. The control plane 210 may process virtual resource provisioning requests, manage allocation of virtual resources 212 to implementation resources 220 and/or manage allocation of implementation resources 220 to virtual resources 212, as well as provide for associated cost accounting services. An example virtual resource provider control plane in accordance with at least one embodiment is described below in more detail with reference to FIG. 10.

When a particular implementation resource of the implementation resources 220 participates in the implementation of multiple virtual resources of the virtual resources 212, the implementation resource may become contended, for example, the implementation resource may receive sufficient service requests from the multiple virtual resources that request servicing time increases. Contended implementation resources can be a source of unintended and/or unauthorized information transfer between virtual resources, for example, based at least in part on variation in request servicing time. In at least one embodiment, a set of customers may establish a barrier to such information transfer to other customers of the virtual resource provider 206 at least in part by requesting that virtual resources associated with the set of customers be provisioned with dedicated implementation resources. Such barriers may lower a probability that one or more of the other customers of the virtual resource provider gains unauthorized read and/or write access to information (including unpublished information) concerning the virtual resources of the set of customers. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

Figure 3:
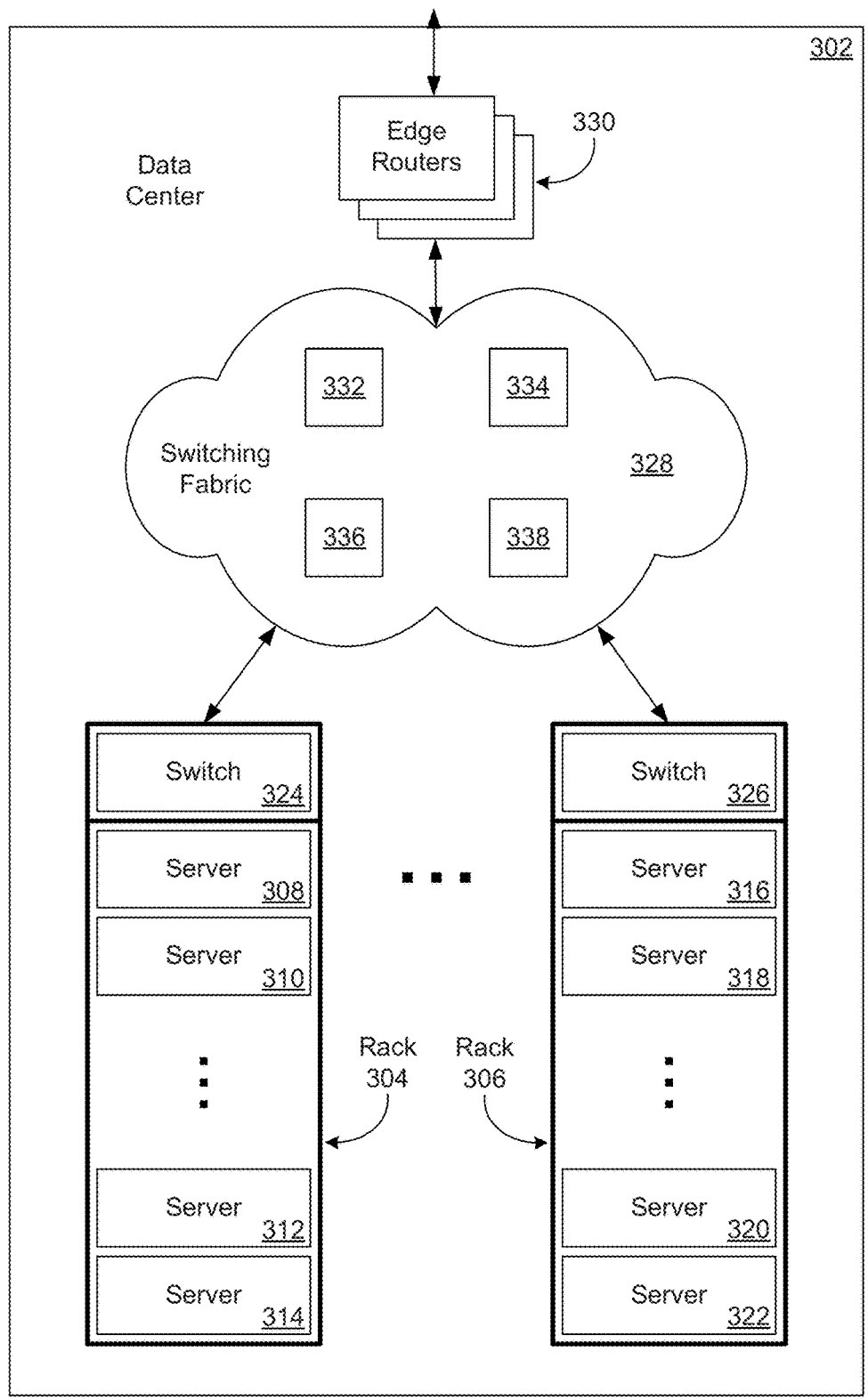
FIG. 3 is a schematic diagram depicting further aspects of the example data centers in accordance with at least one embodiment.

FIG. 3 depicts further aspects of data centers in accordance with at least one embodiment. A data center 302 may include multiple server racks 304-306. The data center 302 is an example of the data centers 402, 404 of FIG. 4. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple server computers 308-314 and 316-322. Again, the ellipses indicate that the server racks 304-306 may include any suitable number of server computers. For example, the server computers 308-322 may include one or more VCS servers 222 (FIG. 2) and/or one or more data store servers 226. Each server 308-322 may correspond to an implementation resource dedication unit.

In FIG. 3, each server rack 304-306 is depicted as including a rack switch 324-326. The rack switches 324 and 326 may be responsible for switching packets of digital data to and from their respective sets of server computers 308-314 and 316-322. Each rack switch 324-326 may correspond to an implementation resource dedication unit. However, in the case (depicted in FIG. 3) that the server rack 304-306 includes one rack switch 324-326, dedicating the rack switch 324-326 to a particular set of customers of the virtual resource provider 206 (FIG. 2) causes dedication of the respective server rack 304-306. This is an example of dedication of a component (an implementation resource dedication sub-unit) of an implementation resource dedication unit causing dedication of the containing dedication unit ("containing unit dedication") in accordance with at least one embodiment. Implementation resources dedication units may indicate which (if any) of their sub-units cause containing unit dedication.

The rack switches 324-326 may be communicatively linked to a data center switching fabric 328 and then to a set of edge routers 330 that connects the data center 302 to one or more other computer networks including the Internet. The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328. The rack switches 324-326, the edge routers 330, and the components of the switching fabric 328 are examples of the network hardware 224 of FIG. 2.

Portions of the switching fabric 328, sets of switching fabric 328 networking components such as sets of the switches 332-338, and/or the edge routers 330 may correspond to implementation resource dedication units. Alternatively, or in addition, a particular set of customers of the virtual resource provider 206 (FIG. 2) may specify that virtual resources of the set of customers be provisioned with a set of dedicated data paths and/or channels (collectively, "data paths") through the switching fabric 328 and/or the edge routers 330. With respect to dedicated data paths, the implementation resource dedication units may correspond to physical data paths such as sets of wires and/or cables. Alternatively, or in addition, the implementation resource dedication units may correspond to hard scheduled communication time slots in a synchronous communication scheme.

Figure 4:
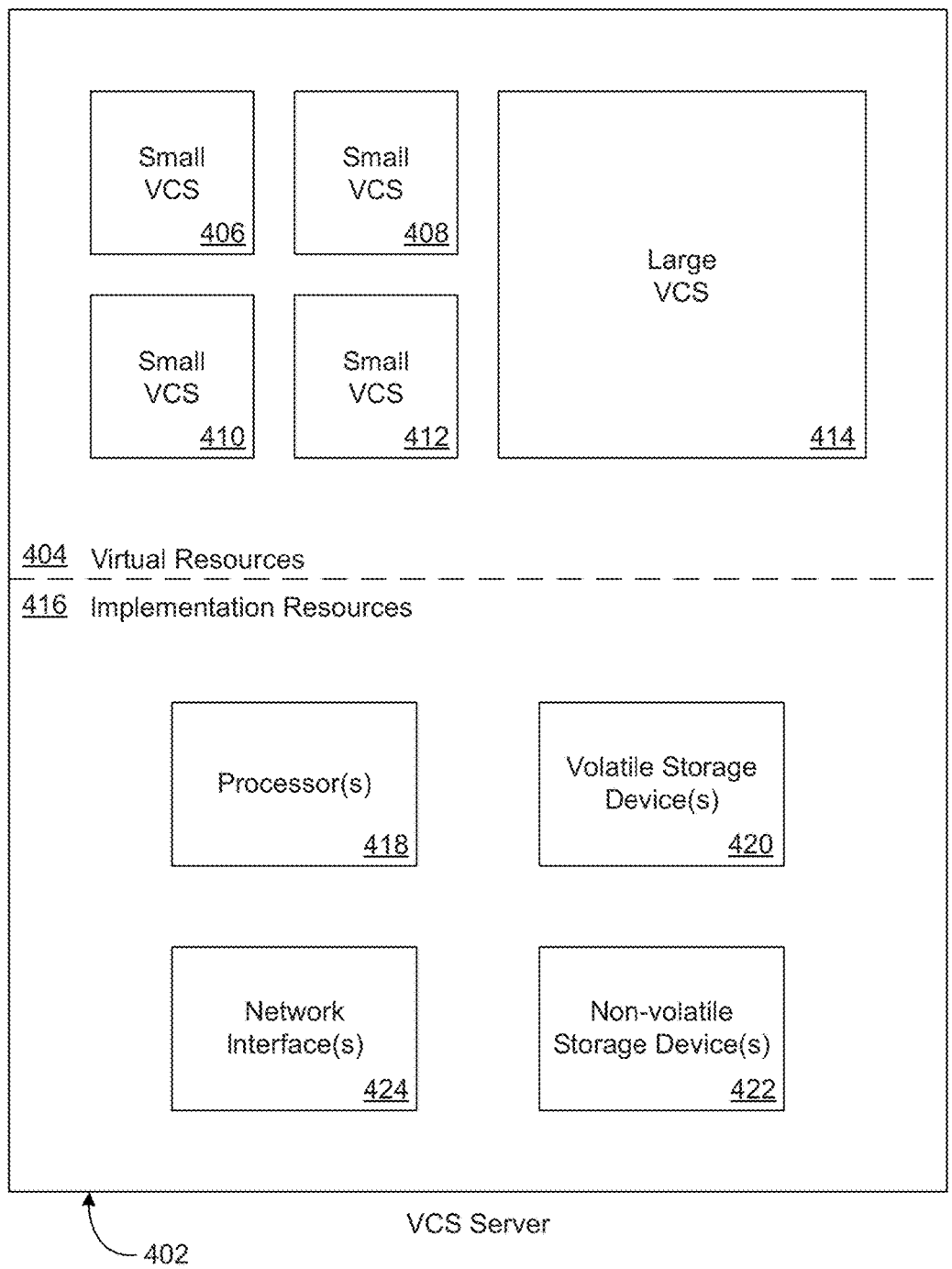
FIG. 4 is a schematic diagram depicting aspects of an example virtual computing system server in accordance with at least one embodiment.

Implementation resource dedication boundaries and/or units may also correspond to portions of a server computer in at least some embodiments. FIG. 4 depicts aspects of an example VCS server 402 in accordance with at least one embodiment. The VCS server 402 of FIG. 4 is an example of the VCS servers 222 of FIG. 2. Virtual resources 404 implemented by the VCS server 402 may include multiple virtual computer systems (VCS) 406-414 of various types. The virtual resources 404 may be implemented with any suitable implementation resources 416 of the VCS server 402. Examples of suitable implementation resources 416 include one or more processors 418 such as central processing units (CPUs) and multi-core CPUs, one or more volatile storage devices 420 such as random-access memory (RAM), one or more non-volatile storage devices 422 such as flash memory and hard disk drives (HDDs), and/or one or more network interfaces 424 such as network interface cards (NICs). Each processor 418, volatile storage device 420, non-volatile storage device 422, and/or network interface 424 may correspond to an implementation resource dedication unit.

Each of the virtual computer systems 406-414 may be implemented with a set of the implementation resources 416. Different types of the virtual computer systems 406-414 may be implemented with different sets of the implementation resources 416. For example, a "large" type virtual computer system may require more implementation resources than a "small" type virtual computer system. A "memory intensive" type of virtual computer system may require an additional portion of the volatile storage device(s) 420 implementation resource. A "processing intensive" type of virtual computer may require an additional portion of the processor(s) 418 implementation resource. The example depicted in FIG. 4 shows the VCS server 402 maintaining four "small" virtual computer systems 406-412 and one "large" virtual computer system 414. This is an example of a virtual resource implementation capacity of the VCS server 402. Of course, other configurations are possible. For example, the VCS server 402 may be able to maintain eight "small" virtual computer systems absent the "large" virtual computer system 414, and so on.

The "small" type virtual computer system may correspond to a minimal virtual resource maintained by the VCS server 402 and/or to a unit virtual computer system cost. The virtual resource provider 206 (FIG. 2) may measure, estimate and/or determine costs for other types of virtual computer system, including virtual computer systems implemented with dedicated implementation resources, in terms of the number of "small" type virtual computer systems displaced by the type. For example, a particular set of customers of the virtual resource provider may specify that virtual computer systems of the set of customers are to be implemented with dedicated hard disk drives. If the VCS server 402 is typically configured to share each hard disk drive with two "small" virtual computer systems, then the virtual computer systems with dedicated hard disk drives displace at least two such "small" virtual computer systems.

Figure 5:
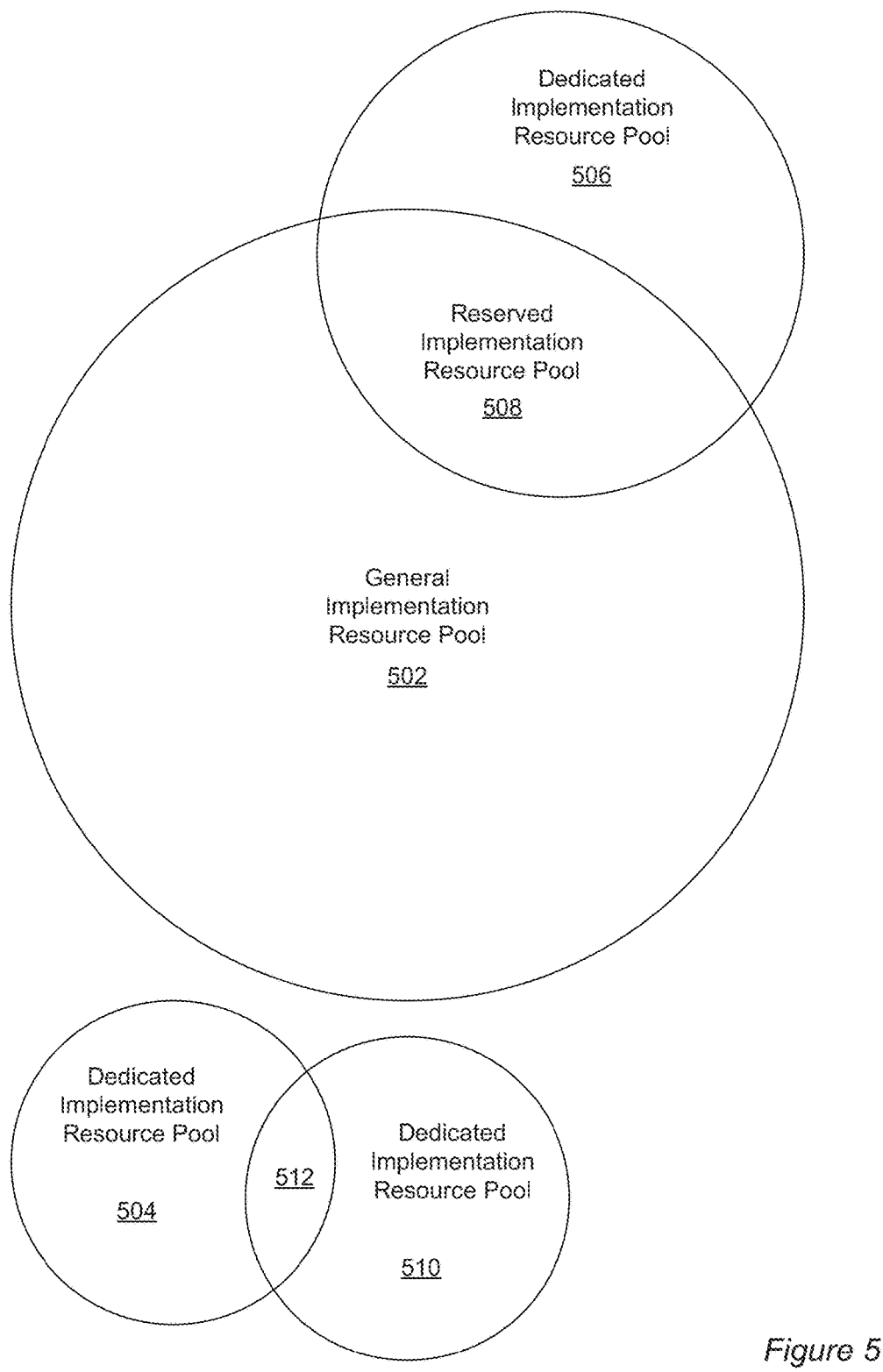
FIG. 5 is a schematic diagram depicting aspects of example implementation resource pools in accordance with at least one embodiment.

In at least one embodiment, dedicated implementation resources are drawn (i.e., allocated) from dedicated implementation resource pools. For example, a dedicated implementation resource pool may be established corresponding to each set of customers of the virtual resource provider 206 (FIG. 2) that requests the provisioning of virtual resources 212 with dedicated implementation resources, and the dedicated implementation resources that implement the requested virtual resources may then be drawn from the dedicated implementation resource pool associated with the set of customers. FIG. 5 depicts aspects of example implementation resource pools in accordance with at least one embodiment. FIG. 5 depicts a general implementation resource pool 502 and three dedicated implementation resource pools 504, 506, 510.

In this example, implementation resources 220 (FIG. 2) begin in the general implementation resource pool 502. The three dedicated implementation resource pools 504, 506, 510 may be established for three different sets of customers of the virtual resource provider 206. The dedicated implementation resource pool 504 and the dedicated implementation resource pool 510 have an overlapping portion 512. Implementation resources in the overlapping portion 512 may be utilized to implement virtual resources of the set of customers associated with either the dedicated implementation resource pool 504 or the dedicated implementation resource pool 510. Alternatively, or in addition, the overlapping portion 512 may be configured as a distinct dedicated implementation resource pool 512 associated with virtual resources, including joint virtual resources, of the joint set of customers associated with both the dedicated implementation resource pool 504 and the dedicated implementation resource pool 510.

Implementation resources 220 may be transitioned from the general implementation resource pool 502 to the dedicated implementation resource pools 504, 506, 510, 512 in accordance with implementation resource transition procedures specified by at least one of the respective set of customers, thereby dedicating the transitioned implementation resources to the set of customers. Implementation resources 220 may be transitioned to the dedicated implementation resource pools 504, 506, 510, 512 responsive to virtual resource provisioning requests. Such requests may fail and/or be delayed with respect to fulfillment when the general implementation resource pool 502 contains insufficient implementation resources of the type(s) required to fulfill the requests. To avoid such problems, virtual resource provider 206 customers may establish reserved implementation resource pools.

In the example depicted in FIG. 5, the set of customers associated with the dedicated implementation resource pool 506 has established a reserved implementation resource pool 508 (e.g., with the control plane 210 of FIG. 2). In at least one embodiment, implementation resources 220 in the reserved implementation resource pool 508 remain in the general implementation resource pool 502 until required to fulfill a virtual resource provisioning request. However, when required, implementation resources 220 in the reserved implementation resource pool 508 are transitioned to the dedicated implementation resource pool 506 even when, at the time, those implementation resources are participating in the implementation of virtual resources of one or more other customers. That is, the set of customers associated with the reserved implementation resource pool 508 is given priority to the implementation resources 220 in the reserved implementation resource pool 508. The virtual resources of preempted customers may be migrated to implementation resources in the general implementation resource pool 502 or, when the general implementation resource pool 502 does not contain sufficient implementation resources of the appropriate type(s), the virtual resources may be de-provisioned.

Figure 8:
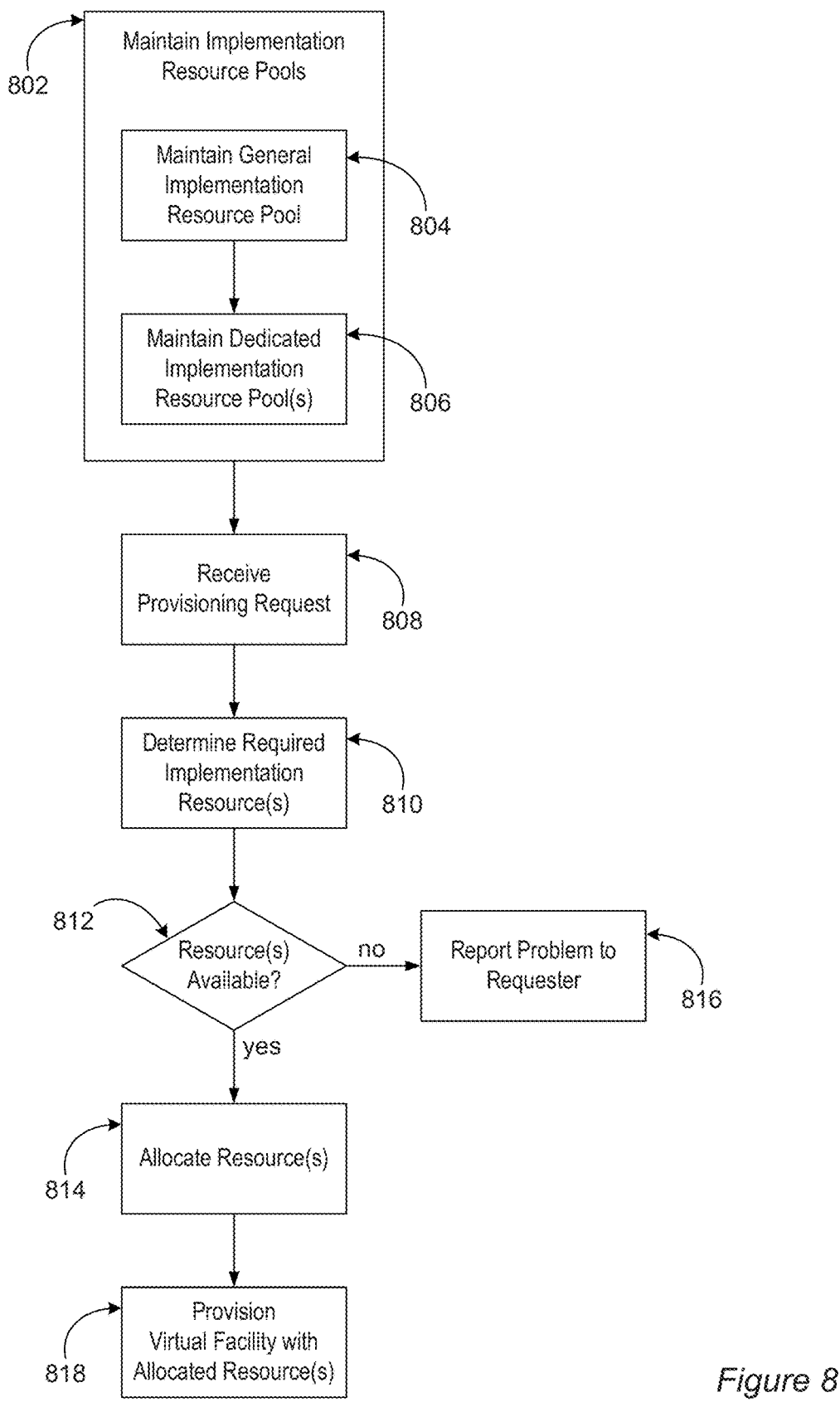
FIG. 8 is a flowchart depicting example steps for virtual provisioning in accordance with at least one embodiment.

Although some dedicated implementation resource pool transition procedures can be fast (e.g., on the order of milliseconds), some transition procedures, particularly custom transition procedures specified by at least one customer of the virtual resource provider 206, require a significant amount of time to complete (e.g., seconds, minutes, hours, and more). FIG. 8 depicts aspects of example dedicated implementation resource pool transition procedure timing in accordance with at least one embodiment.

Figure 6:
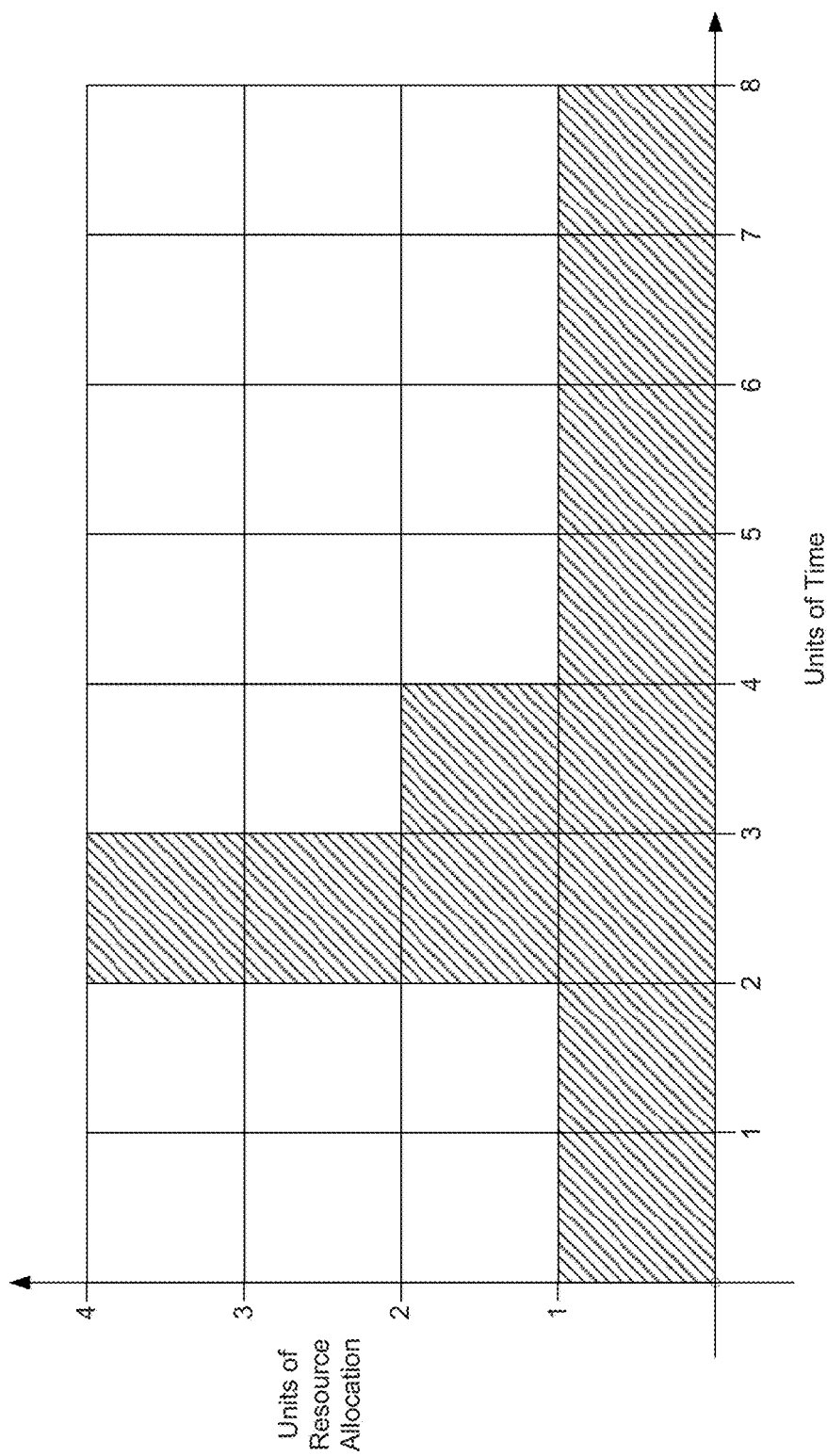
FIG. 6 is a graph depicting aspects of an example implementation resource utilization accounting scheme in accordance with at least one embodiment.

As described above with respect to FIG. 4, some implementation resources may implement multiple virtual resources (i.e., may be "apportionable" implementation resources). For example, the VCS server 402 may implement multiple virtual computing systems. In such cases it can happen that one portion of an apportionable implementation resource is allocated to implementing one or more virtual resources (is "allocated"), while another portion remains unallocated. When the apportionable implementation resource is dedicated to a particular set of customers of the virtual resource provider 206 (FIG. 2), the unallocated portion is furthermore unavailable for allocation to other customers of the virtual resource provider, and this may correspond to a decreased probability that the dedicated apportionable implementation resource will achieve 100% utilization. From the point of view of the virtual resource provider 206, this is an opportunity cost. Such costs can be accounted for in a variety of ways. FIG. 6 depicts aspects of an example implementation resource utilization accounting scheme in accordance with at least one embodiment.

FIG. 6 depicts utilization of an example apportionable implementation resource incorporating four units of resource allocation (or "resource allocation units") each capable of independently participating in the implementation of one or more virtual resources 212 (FIG. 2). For example, the example apportionable implementation resource may be one of the VCS servers 222 capable of implementing four "small" type virtual computer systems, or one "large" type virtual computer system. The virtual resource implementation capacity of an apportionable implementation resource may be measured in resource allocation units. For example, the implementation capacity of the VCS servers 222 may be measured in terms of a standardized virtual computer system unit such as the "small" type virtual computer system. It should be noted that, the number of resource allocation units an implementation resource is capable of maintaining may differ from a number of resource allocation units the implementation resource is actually capable of maintaining. For example, a VCS server may be physically capable of maintaining much more than four virtual computer systems. However, as the VCS server is used to maintain more virtual computer systems, the performance of the virtual computer systems may degrade as the virtual computer systems compete for computing resources (such as processing capacity and/or memory access) of the VCS server. Accordingly, the number of resource allocation units an implementation resource is capable of maintaining may be a number that is determined by a virtual resource provider in a manner that suits the purposes of the virtual resource provider. The virtual resource provider may, for example, determine the number of resource allocation units to be a number determined suitable for balancing the potentially competing interests of offering the most resource allocation units possible against offering the highest performance.

FIG. 6 further depicts utilization of the example apportionable implementation resource over eight units of time (or "time units", e.g., seconds, hours, months, and so on). During the first two time units, one of the four resource allocation units is allocated (as indicated by the square shaded with diagonal lines), and may be active (i.e., actively participating in the implementation of at least one virtual resource), while three of the four resource allocation units are unallocated (as indicated by the unshaded squares), and are inactive. In at least one embodiment, allocated resource allocation units that are idle are also considered inactive. During the third time unit, each of the four resource allocation units are allocated. During the fourth time unit, two of the four resource allocation units are allocated. For the remaining four time units, one of the four resource allocation units are allocated.

Each square in FIG. 6, shaded or unshaded, corresponds to a resource utilization amount, namely a multiplicative product of a resource allocation unit and a time unit (herein called a "resource hour" for clarity). For example, VCS server utilization may be measured in "small" VCS hours. If the example apportionable implementation resource were in the general implementation resource pool 502 (FIG. 5), 4×8=32 resource hours would be available for allocation. In the example utilization depicted in FIG. 6, 12 resource hours are actually allocated over the 8 "hour" time period, resulting an opportunity cost of 20 resource hours to the virtual resource provider 206 (FIG. 2) if the example apportionable implementation resource is dedicated to a particular customer.

Figure 7:
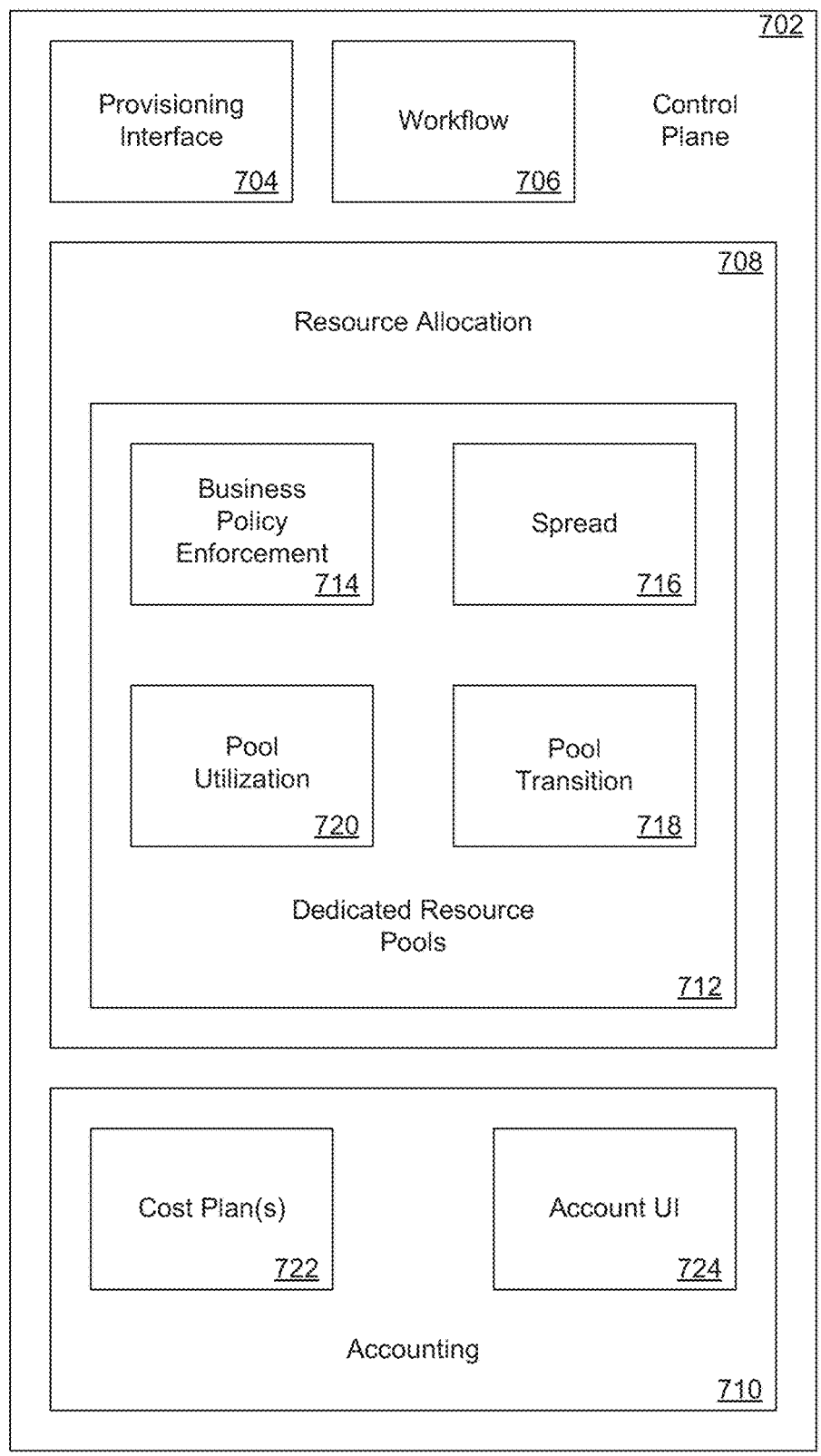
FIG. 7 is a schematic diagram depicting aspects of an example virtual resource provider control plane in accordance with at least one embodiment.

Provisioning, configuration, re-configuration, and/or de-provisioning (collectively, "provisioning") of virtual resources may be controlled by the control plane 210 (FIG. 2) of the virtual resource provider 206. FIG. 7 depicts aspects of an example control plane 702 in accordance with at least one embodiment. The control plane 702 of FIG. 7 is an example of the control plane 210 of FIG. 2. The control plane 702 may include a provisioning interface 704 configured at least to receive virtual resource 212 provisioning requests from one or more of the clients 202-204, a workflow component 706 configured at least to guide responses to provisioning requests in accordance with one or more provisioning workflows, a resource allocation component 708 configured at least to manage allocation of implementation resources 220 to virtual resources 212, and an accounting component 710 configured at least to track and present costs associated with the virtual resources 212 and/or the implementation resources 220.

The provisioning interface 704 may include any suitable provisioning interface elements. Examples of suitable provisioning interface elements include interface elements that correspond to requests to provision, configure, reconfigured and/or de-provision the virtual resources 212 (FIG. 2), as well as interface elements that provide access to virtual resource 212 configuration information, and one or more interface elements enabling authentication to establish authority for such provisioning-related operations. The provisioning interface 704 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 704 correspond to messages of a communication protocol, and/or any suitable combination thereof.

In at least one embodiment, the provisioning interface 704, the resource allocation component 708, and the accounting component 710 may create, and/or cause the workflow component 706 to create, one or more workflows that are then maintained by the workflow component 706. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 708. As another example, a policy enforcement workflow may be created from a policy enforcement workflow template configured with parameters by the resource allocation component 708.

The workflow component 706 may modify, further specify and/or further configure established workflows. For example, the workflow component 706 may select particular implementation resources 220 (FIG. 2) of the virtual resource provider 206 to execute and/or be assigned to particular tasks. Such selection may be based at least in part on the computing resource needs of the particular task as assessed by the workflow component 706. As another example, the workflow component 706 may add additional and/or duplicate tasks to an established workflow and/or reconfigure information flow between tasks in the established workflow. Such modification of established workflows may be based at least in part on an execution efficiency analysis by the workflow component 706. For example, some tasks may be efficiently performed in parallel, while other tasks depend on the successful completion of previous tasks.

As part of provisioning a virtual resource, the provisioning interface 704 and/or the workflow component 706 may request that the resource allocation component 708 determine the appropriate set of the implementation resources 220 (FIG. 2) required to implement the virtual resource, determine whether the required implementation resources are available and/or in accordance with virtual resource provider 206 allocation policies, and/or allocate the required implementation resources. The resource allocation component 708 may incorporate any suitable resource allocation and/or resource scheduling algorithm. Such algorithms are well known to those of skill in art, and need not be described here in detail. The resource allocation component 708 may include a dedicated resource pools component 712 configured at least to manage the establishment and maintenance of dedicated implementation resource pools such as the dedicated implementation resource pools 504, 506 of FIG. 5.

The dedicated resource pools component 712 may include a business policy enforcement component 714 configured at least to analyze an allocation request with respect to a set of resource allocation business policies and provide an evaluation (e.g., permit or deny) with respect to whether the allocation request is in accordance with the set of resource allocation business policies. Alternatively, or in addition, the business policy enforcement component 714 may participate in allocation of implementation resources 220 (FIG. 2) to virtual resources 212, and/or virtual resources 212 to implementation resources 220, to enforce the set of resource allocation business policies. The set of resource allocation business policies may include any suitable resource allocation policies. Examples of suitable resource allocation policies include policies having conditions based on parameters such as type and/or number of dedicated virtual resources requested, corresponding type and/or number of dedicated implementation resources, cost plan of requesting customer, current levels and/or proportions of unallocated implementation resources, forecast levels and/or proportions of inactive dedicated implementation resources (e.g., in the requesting customer's dedicated implementation resource pool), and suitable combinations thereof. Resource allocation policies may include any suitable conditions such as compound conditions specified with Boolean operators and conditions specifying that particular numbers, levels and/or proportions are above a minimum value, below a maximum value and/or within a specified range of values.

With respect to implementation resources that implement multiple virtual resources, virtual resource density or virtual resource spread corresponds to a number of virtual resources per unit implementation resource (e.g., the number of virtual computing systems per VCS server 602). Customers of the virtual resource provider 206 (FIG. 2) may request that provisioned virtual resources have a specified density or spread, for example, to reduce a probability that multiple of the customer's virtual resources will be affected by an implementation resource failure. High spreads (low densities) for virtual resources implemented with dedicated implementation resources can result in poor implementation resource utilization efficiencies (e.g., relatively high inactive implementation resource utilization to active implementation resource utilization ratios such as utilization ratios over 20%). In at least one embodiment, the set of resource allocation business policies may include one or more policies having conditions based on virtual resource density and/or spread levels (e.g., setting one or more density and/or spread limits). The dedicated resource pools component 712 may further include a spread component 716 configured at least to allocate dedicated implementation resources in accordance with permitted density and/or spread levels. Alternatively, or in addition, the spread component 716 may be configured at least to allocate and/or reallocate dedicated implementation resources to achieve a maximum permitted and/or specified virtual resource density, and/or to maximize a number of free (i.e., 0% allocated) implementation resource dedication units.

The dedicated resource pools component 712 may further include a pool transition component 718 configured at least to transition and/or manage the transition of implementation resources 220 to and from dedicated implementation resource pools 504, 506 (FIG. 5). The implementation resources 220 (FIG. 2) may be associated with a set of dedicated pool transition procedures. For example, each type of implementation resource may have an associated transition procedure. Alternatively, or in addition, customers of the virtual resource provider 206 may specify dedicated pool transition procedures for particular types of virtual resource and/or implementation resource. The pool transition component 718 may identify a set of appropriate transition procedures associated with a particular set of virtual resources to be provisioned with implementation resources that include one or more dedicated implementation resources. The pool transition component 718 may execute such transition procedures. Alternatively, or in addition, the pool transition component 718 may create (or cause the workflow component 706 to create) one or more dedicated pool transition workflows corresponding to the identified set of dedicated pool transition procedures.

The dedicated resource pools component 712 may further include a pool utilization component 720 configured at least to monitor activity and/or inactivity levels in dedicated implementation resource pools 504-506 (FIG. 5), forecast activity and/or inactivity levels in dedicated implementation resource pools 504-506, and initiate implementation resource transitions to and from dedicated implementation resource pools 504-506. Implementation resources in dedicated implementation resource pools 504-506 may be inactive for a variety of reasons. For example, implementation resources may have been transitioned to the dedicated pools 504-506 in anticipation of virtual resource provisioning requests that have not yet occurred, or to participate in the implementation of virtual resources that have been de-provisioned. Such inactive implementation resources may be an unnecessary expense for the responsible customer and/or an opportunity cost for the virtual resource provider 206 (FIG. 2).

However, since the time to transition implementation resources from the general implementation resource pool 502 (FIG. 5) may be significant, some level of inactivity in dedicated implementation resource pools 504-506 (i.e., an inactive dedicated implementation resource "buffer") may be desirable. The responsible customer and/or a virtual resource provider 206 (FIG. 2) administrator may specify one or more target levels of activity and/or inactivity for each dedicated implementation resource pool 504-506. In at least one embodiment, an activity and/or inactivity target may be set for each type of implementation resource. Activity and/or inactivity targets may be specified in terms of resource allocation unit numbers, implementation resource dedication unit numbers, proportions thereof, and/or derivatives thereof including rates of change, change velocities, change accelerations, first derivatives, second derivatives, third derivatives, and any suitable level derivative. The pool utilization component 720 may forecast values corresponding to activity and/or inactivity targets based at least in part on monitored activity and/or inactivity levels, and schedule implementation resource transitions to and from the dedicated implementation resource pools 504-506 to meet corresponding activity and/or inactivity targets based at least in part on the forecast values.

The accounting component 710 may maintain an account for each customer of the virtual resource provider 206 (FIG. 2). Utilization and/or costs associated with virtual resources 212 provisioned by a customer, and/or associated implementation resources 220, may be recorded in the customer's account. The accounting component 710 may maintain one or more cost plans 722 specifying how the costs are allocated to the customer's account. The accounting component 710 may include an account user interface (UI) component 724 configured at least to provide the customer with one or more presentations of the utilization and/or costs recorded in the customer's account and, when one or more of the costs correspond to a financial balance owed to the virtual resource provider 206, one or more mechanisms for settling the account balance (e.g., payment instrument processing). The account UI 724 may further provide for account creation, account configuration and reconfiguration, account details viewing and updating, as well as account deletion. Account (re)configuration may include selection from a qualified list of cost plans 722 when multiple such cost plans 722 are available.

The cost plan(s) 722 may specify a cost per resource hour corresponding to each type of virtual resource 212 and/or implementation resource 220 (FIG. 2). Costs may be incurred by a customer for allocated and/or active resource hours ("activity costs"), for example, at an active implementation resource cost rate. In at least one embodiment, costs may also be incurred by the customer for unallocated and/or inactive resource hours associated with implementation resources in pools 504-506 (FIG. 5) dedicated to the customer ("dedicated resource costs" or "inactivity costs"), for example, at an inactive implementation resource cost rate. In at least one embodiment, activity costs and dedicated resource costs are maintained separately in a customer's account, and explicitly presented as separate items in corresponding cost statements. Alternatively, activity costs and/or rates may be adjusted to account for dedicated resource costs so that cost statements need not include an item that explicitly states dedicated resource costs. The cost plan(s) 722 may include any suitable function of allocated, unallocated, active and/or inactive resource hours including suitable linear functions and suitable non-linear functions.

For example, activity costs and/or rates may be adjusted on a per customer basis. Cost statements may be generated periodically and each state costs incurred during a time period (the "cost statement time period") elapsed since a previously generated cost statement. Activity costs and dedicated resource costs incurred by a particular customer may be determined for the time period, and the activity costs and/or rates adjusted (e.g., increased) to include the dedicated resource costs for the time period. For example, suppose the customer provisions fifty virtual computers systems 214 (FIG. 2) and specifies that each of the fifty are to be implemented with dedicated implementation resources. In response, the resource allocation component 708 dedicates four VCS servers 222 to the customer, each capable of implementing sixteen of the virtual computer systems requested by the customer, thus removing a capability of implementing sixty four such virtual computer systems from the general implementation resource pool 502 (FIG. 5). Further suppose the cost plan(s) 722 for the customer's account specifies base rates of $0.10 per active dedicated resource hour and $0.05 per inactive dedicated resource hour. Over a thousand hour time period, the customer incurs 50×1000×$0.10=$5000 in active costs and 14×1000×$0.05=$700 in dedicated resource costs, for a total of $5700 in costs. As an alternative to presenting separate items for active costs and dedicated resource costs, the cost statement for the time period may present a single item corresponding to 50×1000×$0.114=$5700. That is, in this example, the customer's base rate per active resource hour is adjusted to cover total costs for the time period.

As another example, activity costs and/or rates may be adjusted on a per virtual resource type and/or dedicated implementation resource type basis. Activity costs and dedicated resource costs corresponding to a particular type of virtual resource and/or dedicated implementation resource may be determined for the cost statement time period, and the activity costs and/or rates adjusted to include the dedicated resource costs for the time period. For example, suppose that customers of the virtual resource provider 206 (FIG. 2) collectively provision virtual resources corresponding to one million resource allocation units of a particular type implemented with dedicated implementation resources in one or more dedicated pools 504, 506 (FIG. 5), and that, as part of the dedication process, a further twenty thousand resource allocation units of that type were transitioned from the general implementation resource pool 502 but remain inactive. Collectively, the virtual resource provider has an inactive dedicated resource allocation unit to active dedicated resource allocation unit ratio (an "inactive dedicated ratio" denoted herein with the letter $\alpha$) of 2% in this example. The inactive dedicated ratio may also be determined from implementation resource utilization amounts. Further suppose that the customers are allocated costs in accordance with a common cost plan again specifying a base rate of $0.10 per active dedicated resource hour ($c_{active}$) and $0.05 per inactive dedicated resource hour ($c_{inactive}$). The adjusted rate per active dedicate resource hour ($c'_{active}$) may be determined with the formula:

$$c'_{active} = c_{active} + \alpha c_{inactive}.$$

That is, $0.10+2%×$0.05=$0.101, in this example.

Adjustments to account for dedicated resource costs may be determined with respect to a set of time periods, for example, including one or more previous time periods and/or forecast resource allocation unit utilization in one or more future time periods. When different customers and/or provisioned resource allocation units are associated with different cost plans, adjustments corresponding to the cost plans may be different, for example, weighted based at least in part on cost plan attributes such as cost plan type, associated customer type, profitability and/or differing base rates. In addition, activity costs and/or dedicated resource costs may be modified based at least in part on resource allocation units corresponding to implementation resources in reserved implementation resource pools such as the reserved implementation resource pool 508 of FIG. 5. For example, active and/or inactive dedicated resource hours may be offset by reserved resource hours, and costs associated with reserved resource hours may be presented as a separate item on the responsible customer's cost statement. Further in addition, the cost plan(s) 722 may specify tiered costs and/or resource hour rates, for example, a set of decreasing costs corresponding to a set of increasing virtual resource quantity thresholds (e.g., with respect to virtual resources of a same type) and/or a set of decreasing rates corresponding to a set of increasing resource hour quantity thresholds. Still further in addition, the cost plan(s) 722 may specify costs associated with dedicated implementation resource pool 504-506 transitioning procedures.

The description now turns to example steps and/or procedures that may be performed in accordance with at least one embodiment. FIG. 8 depicts example steps for virtual provisioning in accordance with at least one embodiment. Some or all of the process illustrated in FIG. 8 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, implementation resource pools may be maintained 802. For example, the resource allocation component 708 (FIG. 7) may maintain the general implementation resource pool 502 of FIG. 5 (804) and one or more dedicated implementation resource pools 504-506 (806). In at least one embodiment, maintenance of the dedicated implementation resource pools 504-506 includes migration of virtual resources among the implementation resources in a particular dedicated pool so as to maximize virtual resource density with respect to implementation resources and/or to progress towards virtual resource spread targets. However, dedicated implementation resource pools 504-506 need not be established and/or maintained prior to provisioning at least one virtual resource requiring dedicated implementation resources.

In an embodiment, a virtual resource provisioning request may be received 808. For example, the provisioning interface 704 (FIG. 7) may receive the virtual resource provisioning request from one of the clients 202-204 (FIG. 2) responsive to virtual resource provider 206 customer interaction with the client. The virtual resource provisioning request may incorporate and/or reference a set of implementation resource constraints. For example, the set of implementation resource constraints may include constraints with respect to virtual resource density and/or virtual resource spread, constraints with respect to dedicated implementation resources including that particular types of implementation resources are to be dedicated to virtual resources of the customer, and constraints with respect to implementation resource attributes such as geographic location. A set of implementation resources required to implement the virtual resource requested 808 may be determined 810. For example, the resource allocation component 708 may determine the required set of implementation resources based at least in part on one or more parameters and/or attributes of the virtual resource provisioning request including the set of implementation resource constraints.

It may be determined 812 whether the set of required implementation resources determined 810 are available. For example, the resource allocation component 708 may track availability of implementation resources in the general pool 502 (FIG. 5) and the dedicated pools 504, 506, and compare the set of required implementation resources with an available implementation resource inventory. If each of the set of required implementation resources is available, a procedure incorporating a determination 812 whether the set of required implementation resources determined 810 may progress to allocate resources 814. Otherwise, the procedure may progress to report 816 to the party that sent the provisioning request received 808.

The set of required implementation resources may be allocated 814. For example, the resource allocation component 708 (FIG. 7) may update the available implementation resource inventory and transition implementation resources between pools 502-506 (FIG. 5) as necessary. The resource allocation component 708 may select from among the available implementation resource in accordance with the set of implementation resource constraints. For example, the resource allocation component 708 may select implementation resources with geographical separations that satisfy a constraint specifying a target geographic separation. If the set of implementation resource constraints includes a constraint specifying and/or referencing a virtual resource spread target, the resource allocation component 708 may invoke the spread component 716 select and/or reallocate implementation resources in accordance with the virtual resource spread target. When the set of required implementation resources includes dedicated implementation resources, the spread component 716 may furthermore attempt to maximize virtual resource density while respecting implementation resource virtual resource capacities and/or the virtual resource spread target.

The requested virtual resource may be provisioned 818 with the set of required implementation resources allocated 814. For example, upon receiving notification from the resource allocation component 708 that the resource allocation 814 was successful, the provisioning interface 704 may create a suitable provisioning workflow.

Figure 9:
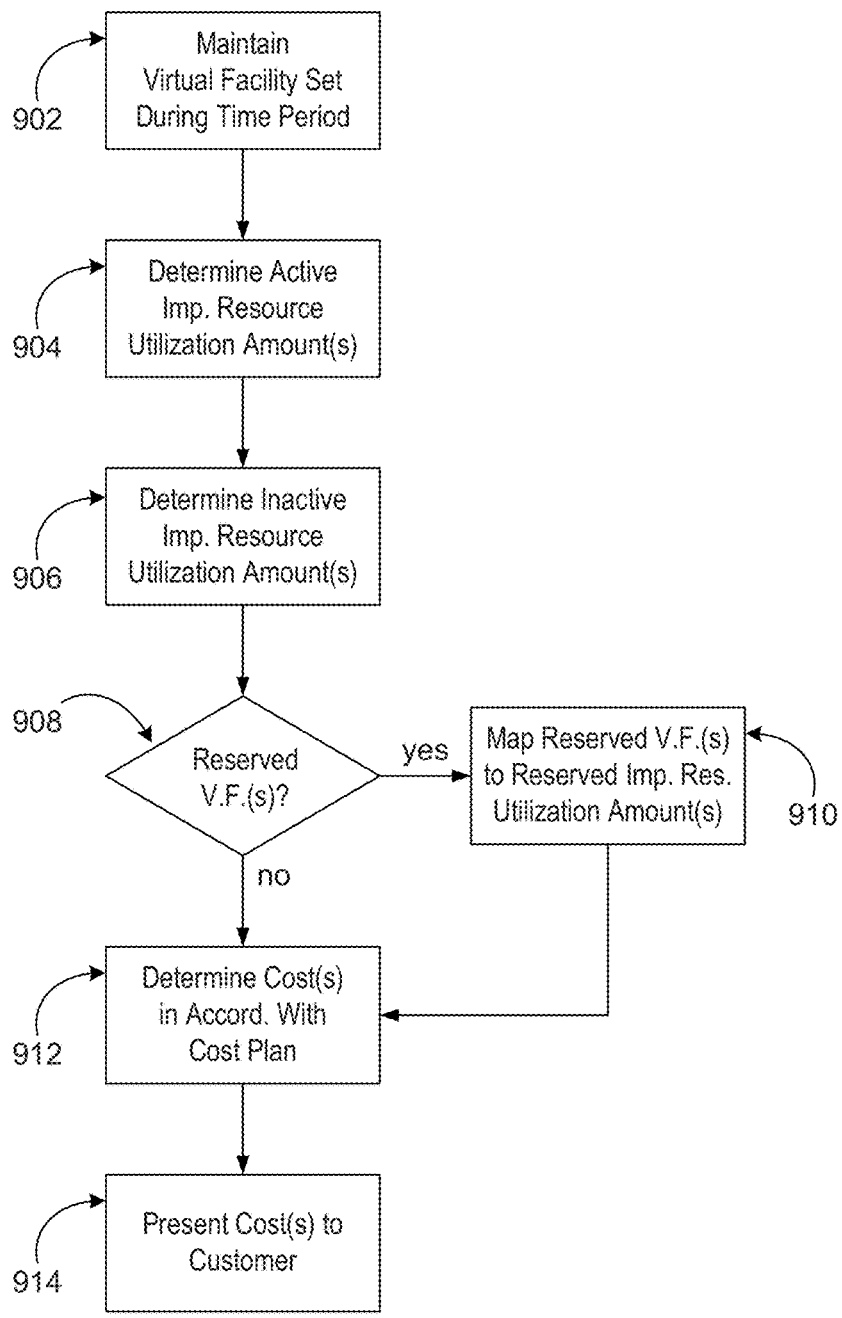
FIG. 9 is a flowchart depicting example steps for tracking costs in accordance with at least one embodiment.

Costs associated with maintaining provisioned virtual resources may be presented to responsible customers of the virtual resource provider 206 (FIG. 2) according to cost presentation schedules specified by an administrator of the virtual resource provider 206 and/or the customers. FIG. 9 depicts example steps for tracking costs in accordance with at least one embodiment. A set of virtual resources may be maintained 902 during a time period. For example, the virtual resource provider 206 may maintain a set of the virtual resources 212 for a particular customer during the time period.

One or more active implementation resource utilization amounts corresponding to the set of virtual resources maintained 902 may be determined 904. For example, the accounting component 710 of FIG. 7 may determine a number of active resource hours associated with each of the set of virtual resources during the time period. One or more inactive implementation resource utilization amounts corresponding to the set of virtual resources maintained 902 may be determined 906. For example, the accounting component 710 may determine a number of inactive resource hours associated with each of the set of virtual resources during the time period.

It may be determined 908 whether the set of virtual resources are associated with a set of reserved virtual resources. For example, the customer may provision the set of reserved virtual resources with the provisioning interface 704 (FIG. 7) and/or associate the set of reserved virtual resources with the previously provisioned set of virtual resources maintained 902. If there are reserved virtual resources associated with the set of virtual resources for which costs are being determined, a procedure incorporating a determination 908 whether the set of virtual resources are associated with a set of reserved virtual resources may progress to map the set of reserved virtual resources to one or more reserved implementation resource utilization amounts. For example, the accounting component 710 of FIG. 7 may determine a number of reserved resource hours associated with each of the set of reserved virtual resources.

Otherwise the procedure may progress and one or more costs may be determined 912 in accordance with one or more cost plans associated with the customer and/or the set of virtual resources. For example, the accounting component 710 (FIG. 7) may determine the cost(s) based at least in part on the cost plan(s) 722 and/or the active, inactive and/or reserved implementation resource utilization amounts determined (904, 906 and/or 910 above, respectively). The cost(s) determined 912 may be presented 914 to the customer. For example, the accounting component 710 may generate one or more cost presentations accessible with the account UI 724.

As discussed, when customers utilize dedicated implementation resources, the actual use of the dedicated implementation resources may be significantly less than an amount of use of which the dedicated implementation resources are capable. A VCS server, for example, may be capable of implementing four virtual computer systems (such as virtual machine instances). If a customer utilizes a dedicated VCS server, but only operates one virtual computer system, there is a lost opportunity to operate an additional three virtual computer systems using available capacity of the VCS server. A virtual resource provider, for example, cannot use the additional capacity of the VCS server to maintain one to three virtual computer systems for one or more additional customers. Accordingly, it may be desirable for a virtual resource provider to charge a customer for use of dedicated implementation resources in a manner that compensates for the lost opportunity.

Figure 10:
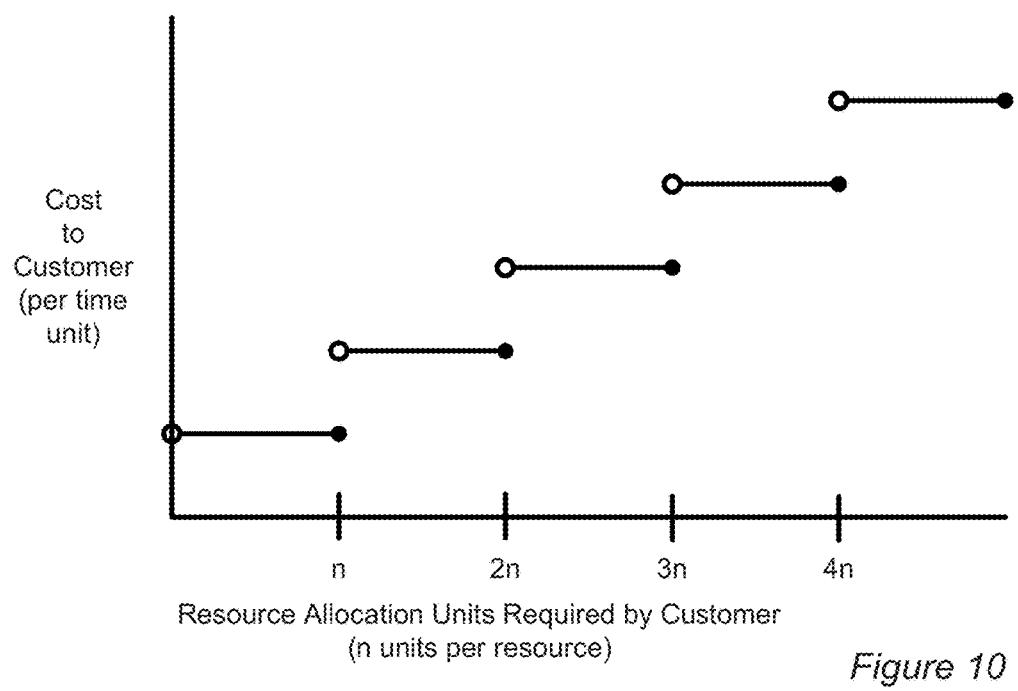
FIG. 10 is a graph illustrating an example cost to a customer of a virtual resource provider in accordance with at least one embodiment.

FIG. 10 shows a graph that illustrates one way of charging customers for use of dedicated implementation resources. In this example, the graph illustrates amounts for charging customers for a number of resource allocation units when those customers use dedicated implementation resources. As illustrated, the dedicated implementation resources are, on average, each capable of maintaining n resource allocation units. Some of the implementation resources may, for example, be able to maintain less than n resource allocation units, some may be able to maintain exactly n resource allocation units, and some may be able to maintain more than n resource allocation units. Alternatively, the implementation resources may be uniform and each able to maintain exactly n resource allocation units. The implementation resources may be, for example, VCS servers and the resource allocation units may correspond to, for example, virtual computer systems. Of course, such resources are discussed throughout for the purpose of illustration and, as noted, the implementation resources may be any resource that is apportionable among any type of resource allocation unit.

As illustrated in FIG. 10, a customer is charged a price for one or more dedicated implementation resources that are necessary to maintain the number of resource allocation units actually used. The price may be per some unit of time that one or more resource allocation units are used. The unit may be an hour, week, month, or, generally, any unit of time. If the customer uses, for example, a number of resource allocation units that is between one and n, the customer is charged for one dedicated implementation resource, regardless of whether the customer uses one resource allocation unit, n resource allocation units, or some number in between. Similarly, if the customer uses between n and 2n resource allocation units, the customer is charged as if the customer completely used two dedicate implementation resources. Likewise, a customer that uses between 2n and 3n is charged as if the customer completely used three implementation resources. In this manner, the customer is charged in a manner that compensates a virtual resource provider for the part of an implementation resource that was not used by the customer, but was nevertheless dedicated to the customer. In other words, the customer is charged for all the capacity dedicated to the customer, whether that capacity was used by the customer or not.

Figure 11:
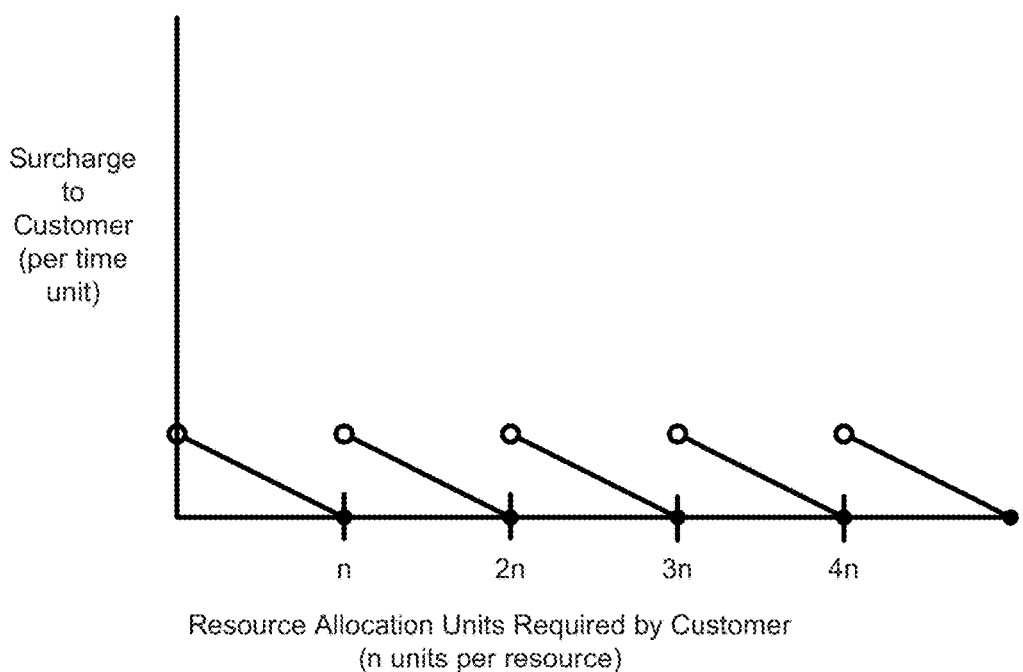
FIG. 11 is a graph illustrating an example surcharge to a customer of a virtual resource provider in accordance with at least one embodiment.

One way of compensating for the opportunity cost of dedicating implementation resources to customers regardless of how much of the capacity of the dedicated implementation resources the customers use is to require customers to pay a surcharge. The surcharge may be, for example, an amount charged to a customer who uses a number of resource allocation units on dedicated implementation resources. Additionally, the surcharge may be a charge per resource allocation unit per unit of time. FIG. 11 shows a graph that illustrates one way of charging to compensate for the lost opportunity when allowing customers to dedicate implementation resources. The surcharge may be in addition to a charge per resource allocation unit, per multiple allocation units, or an other charge.

As shown in FIG. 11, generally, the surcharge to a customer is calculated so that the customer pays for the complete use of a dedicated implementation resource regardless of the amount of the dedicated implementation resource's capacity the customer actually uses. As with FIG. 10, as illustrated in FIG. 11, each implementation resource is capable of maintaining n resource allocation units. Accordingly, for a customer that uses between one and n resource allocation units, the surcharge decreases as the number of resource allocation units used by the customer increases. In other words, as the customer leaves less of a dedicated implementation resource unused, the customer is charged less.

For some numbers of resource allocation units used by a customer, there may be no opportunity cost to a virtual resource provider for providing a dedicated implementation resource. For example, with the example of a dedicated VCS server capable of maintaining four virtual computer systems, if the customer uses four virtual computer systems, there is no unused capacity of the VCS server that the virtual resource provider could have used to maintain a virtual computer system for another customer. In such instances, the surcharge may be zero. For instance, looking at FIG. 11, the surcharge is zero for each integer multiple of n resource allocation units used by the customer. Thus, if a customer uses 2n, 3n, 4n, or another integer multiple of n resource allocation units, the customer may not be charged a surcharge because the customer does not have any dedicated, but not used, capacity that could be used to provide services to other customers and generate revenue accordingly.

Figure 12:
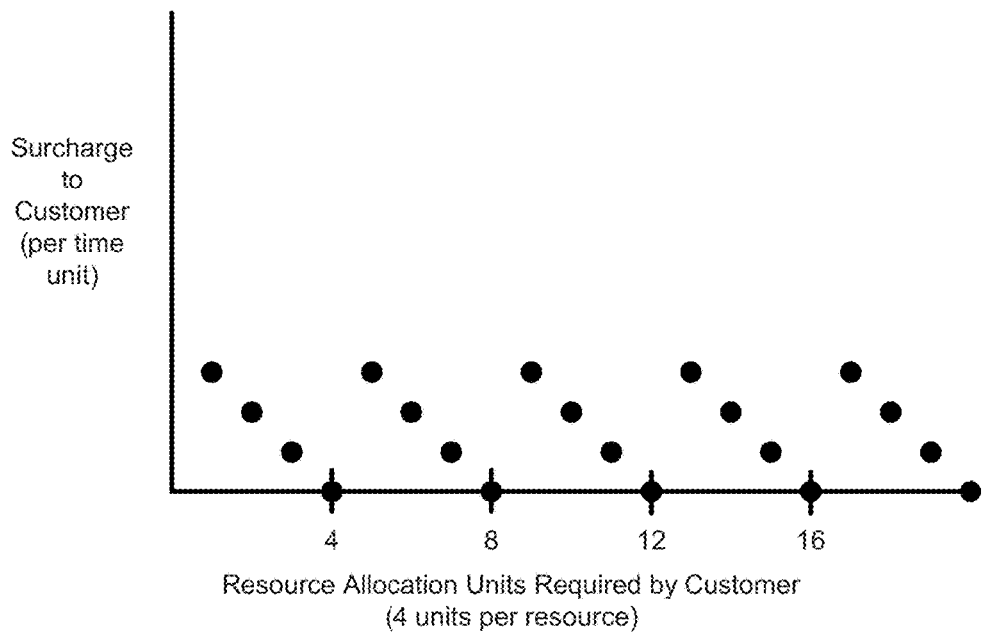
FIG. 12 is a graph illustrating the graph of FIG. 11 when implementation resources on average may maintain four resource allocation units.

FIG. 12 shows a graph illustrating an accounting scheme according to the graph shown in FIG. 11, when n is equal to four. For example, as above, the implementation resources may be dedicated VCS servers on average capable of maintaining four virtual computer systems. As shown in FIG. 12, if the user actually uses one virtual computer system, the surcharge may be the standard charge for three resource allocation units. In this manner, the virtual resource provider is compensated for the lost ability to use the capacity to maintain three virtual computer systems for one or more other customers. Similarly, if the customer uses two virtual computer systems on a dedicated VCS server, the surcharge may be the standard charge for two virtual computer systems, and if the customer uses three virtual computer systems on a dedicated VCS server, the surcharge may be the standard charge for one virtual computer system. Finally, if the user uses 4 virtual computer systems on a dedicated VCS server, the user may not be charged a surcharge. Generally, for dedicated implementation resources, the surcharge in the examples shown in FIGS. 11 and 12 may be based at least in part on the number of resource allocation units used by a customer modulo the average number of resource allocation units the dedicated implementation resource are, on average, capable of maintaining.

In some circumstances, it may not be desirable to charge customers for use of dedicated implementation resources according to the schemes illustrated in FIGS. 10-12. For example, surcharges that fluctuate up and down as the number of resource allocation units increases may not be ideal for customer relations. As an example, with a dedicated VCS server capable of maintaining four virtual computer systems, a customer who increases its use of virtual computer systems from four to five may be unpleasantly surprised at a sudden surcharge that it did not previously have to pay. Similarly, one customer who uses four hundred and one virtual computer systems on dedicated VCS servers (capable of maintaining on average four virtual computer systems) may feel mistreated if it has to pay a surcharge when another customer who uses four virtual computer systems does not. The customer using four hundred and one virtual computer systems may, for example, view itself as a more important customer due to the larger use of the virtual resource provider's services. Other reasons may also make it desirable to charge surcharges in a manner different than illustrated above.

Figure 13:
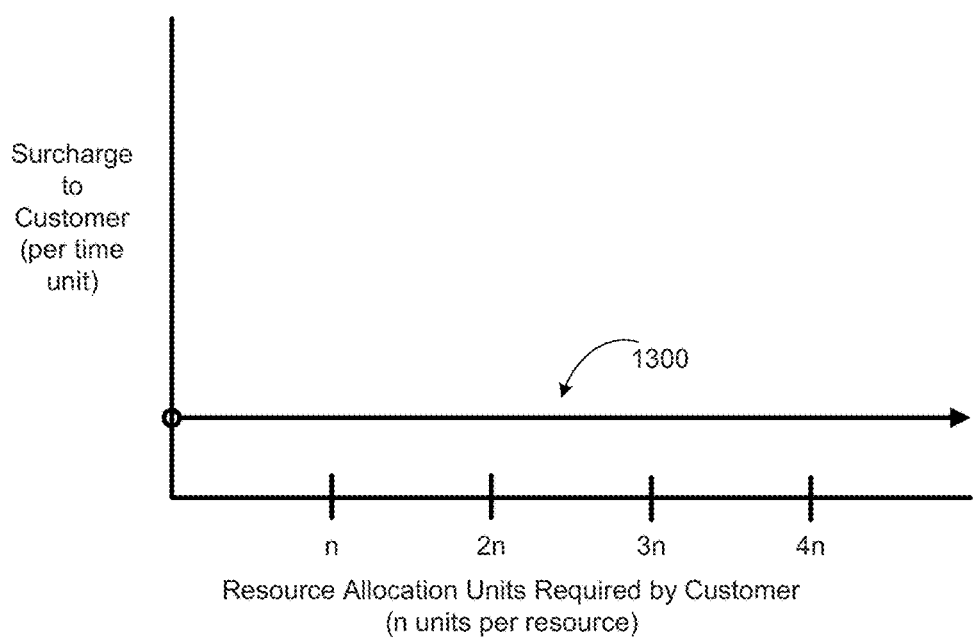
FIG. 13 is a graph illustrating an example pricing curve in accordance with at least one embodiment.

Accordingly, FIG. 13 shows a graph of an illustrative example of an alternative to charging surcharges as illustrated in FIGS. 10-12. A virtual resource provider may, as illustrated in FIG. 13, calculate a surcharge to be calculated for every user of dedicated implementation resources, regardless of the number of resource allocation units used. A virtual resource provider may monitor customer use of dedicated implementation resources and determine that, on average (per unit of time), each user of dedicated implementation resources causes a certain quantity of lost opportunity. A surcharge calculated to compensate for this average lost opportunity is represented by a curve 1300 which, in this example, is a straight horizontal line.

With the example of dedicated VCS servers capable of supporting four virtual computer systems, the virtual resource provider may determine that, per hour, each customer causes a lost opportunity to maintain 2.8 virtual computer systems for other customers. It should be noted that the average lost opportunity may differ from half of the average number of resource allocation units for an implementation resource due to actual customer behavior. For instance, with dedicated VCS servers, it may be much more common for customers to use one virtual computer system on a dedicated VCS server than to use a different number that results in less lost opportunity to the virtual resource provider. In this situation, the average lost opportunity may be more than half of the average number of resource allocation units that an implementation resource is capable of maintaining.

Each customer may then be charged a surcharge that compensates for the lost opportunity with respect to 2.8 virtual computer systems, regardless of the actual number of virtual computer systems used by the customer. Thus, a customer using one virtual computer system on a dedicated VCS server would be charged the same surcharge as charged another customer using thirteen virtual computer systems on a dedicated VCS server, which may the same surcharge charged any customer regardless of the number of virtual computer systems used. Accordingly, as shown in FIG. 13, each customer is charged the same surcharge regardless of the number of resource allocation units actually used.

In some instances, however, it may be desirable to not charge customers in one of the manners described above. For example, customers who use a small number of resource allocation units on dedicated implementation resources may, on average, cause a virtual resource provider more lost opportunity relative to the number of resource allocation units used than customers who use large numbers of resource allocation units. Using the above example of dedicated VCS servers on average capable of maintaining four virtual computer systems, a customer using one virtual computer system causes the virtual resource provider the opportunity to provide three virtual computer systems to other customers. In other words, in this instance, the lost opportunity to the virtual resource provider is three times the number of virtual computer systems actually used by the customer. A customer who uses one thousand and one virtual computer systems on dedicated VCS servers causes the virtual resource provider to also lose the opportunity to maintain three virtual computer systems for other customers. For the customer who uses one thousand and one virtual computer systems, however, the lost opportunity to the virtual resource provider is less than one percent of the number of virtual computer systems used by the customer.

As another example, customers that use large numbers of resource allocation units on dedicated implementation resources may require less of a virtual resource provider's administrative resources per resource allocation unit than customers that use small numbers of resource allocation units. It may be administratively easier, for example, to maintain thousands of resource allocation units on dedicated implementation resources for one customer than to maintain smaller amounts of resource allocation units on dedicated implementation resources for numerous customers. As a result, it may be desirable to encourage customers to use large numbers of resource allocation units on dedicated implementation resources and discourage uses of small numbers of resource allocation units on dedicated implementation resources, while still offering the flexibility of using small numbers of resource allocation units on dedicated implementation resources.

Figure 14:
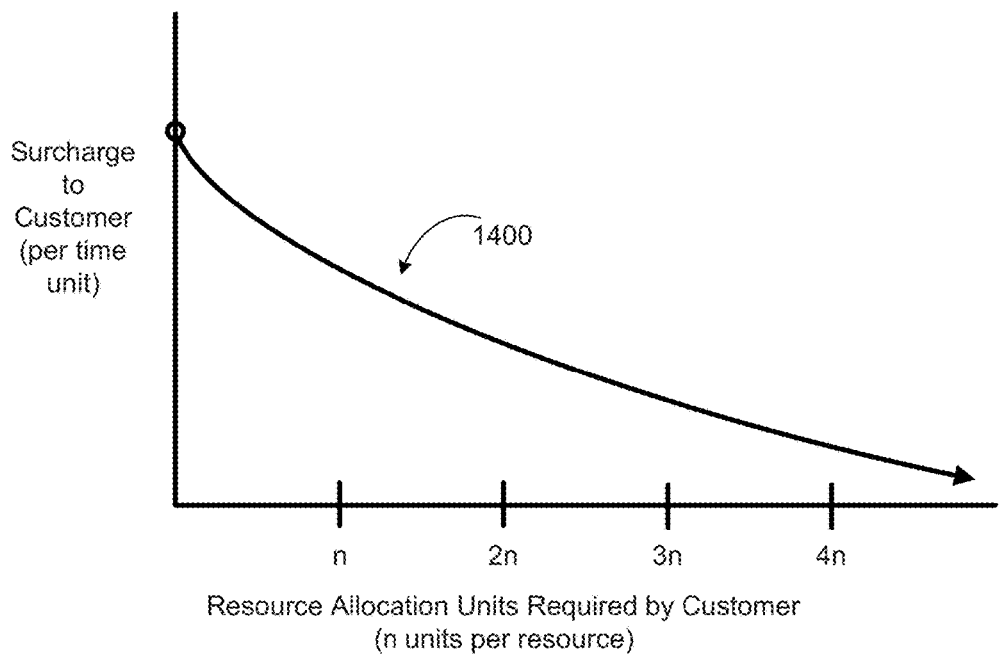
FIG. 14 is a graph illustrating another example pricing curve in accordance with at least one embodiment.

FIG. 14 shows a graph of an illustrative example of how a surcharge may be charged to customers of various numbers of resource allocation units. As with FIG. 10, each implementation resource in this example, on average, can maintain n resource allocation units. In this example, however, a curve 1400 is calculated so as to define a surcharge per resource allocation unit. The curve, in particular, is calculated such that the per-resource allocation unit and per-time unit surcharge is greater for users of fewer resource allocation units than for users of more resource allocation units. In this example, the surcharge approaches zero as the number of resource allocation units used by a customer increases. In some embodiments, the curve may actually take a value of zero for numbers of resource allocation units used by a customer that exceed some predetermined amount.

In an embodiment, the surcharge-defining curve is calculated so as to be cost following. For example, the surcharge may be calculated based at least in part on measurements of past customer behavior such that, for a base of customers, the total amount expected to be charged to the customers is the same as it would be had unused implementation resources not been dedicated. In other words, in an embodiment, the curve is calculated such that the total charged to the customers is the same as if the customers were charged for complete use of the implementation resources dedicated to the customers' use. The customer base may be defined in various ways. The customer base may be a set of customers of implementation resources in a data center or collection of data centers. The customer base may be defined in other ways as well. A customer base may be based on a type of customer. For example, web hosting customers may be one customer base, large batch job customers may be another customer base, customers that take advantage of autoscaling services may be another customer base, and the like.

As a simplified illustrative example, a customer base may include three customers that operate virtual computer systems on dedicated VCS servers that, on average, can support four virtual computer systems. For the purpose of illustration, each customer pays for use of their virtual computer systems for twenty-four hours per day. Over some time period, a first customer, in this example, uses one virtual computer system. Over the same time period, a second customer uses ten virtual computer systems and a third customer uses one hundred and two virtual computer systems. Thus, in this example, the first customer's use results in unused capacity for three virtual computer systems that cannot be used for other customers. The second and third customers' use, in this example, each results in unused capacity for two virtual computer systems. Accordingly, the customer base's total use results in capacity for seven virtual computer systems. A surcharge-defining curve is then calculated so that the three customers collectively pay for the use of seven virtual computer systems. Assuming a charge per virtual computer system of one dollar per hour, the surcharge-defining curve may be calculated such that the three customers are collectively charged seven dollars per hour. For instance, the curve may be calculated such that the first customer is charged a per-hour surcharge of $3.98 ($3.98 per virtual computer system), the second customer is charged a per-hour surcharge of $2.00 ($0.20 per virtual computer system), and the third customer is charged a per-hour surcharge of $1.02 ($0.01 per virtual computer system). Of course, the values used herein are for the purpose of illustration and other values may be used.

Figure 15:
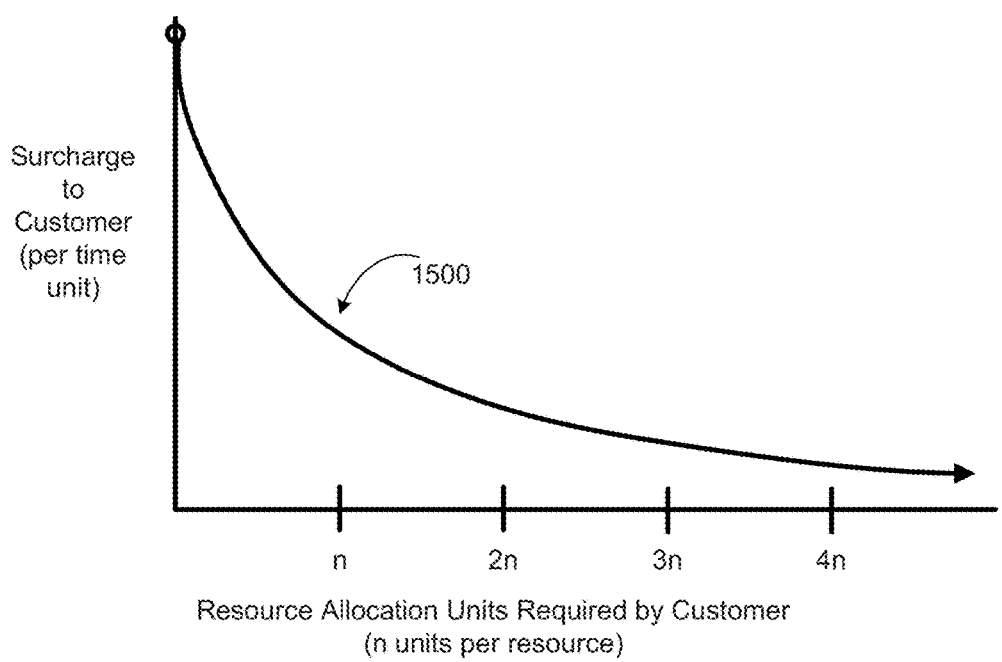
FIG. 15 is a graph illustrating another example pricing curve in accordance with at least one embodiment.

As noted, a surcharge-defining curve may take various shapes depending on how a virtual resource provider determines best to charge customers for dedicated implementation resources. FIG. 15, for example, shows a graph having a curve 1500 that defines a surcharge that is based at least in part on the number of resource allocation units used by a customer. As with FIG. 14, the surcharge may be per unit of time and per resource allocation unit used by the customer. Comparing the curve 1500 in FIG. 15 to the curve 1400 in FIG. 14, however, the curve 1500 is initially steeper and approaches zero faster. In this manner, the curve 1500 in FIG. 15 has been determined so that, when using dedicated implementation resources, customers are rewarded for using more resource allocation units relative to customers who use few resource allocation units.

Figure 16:
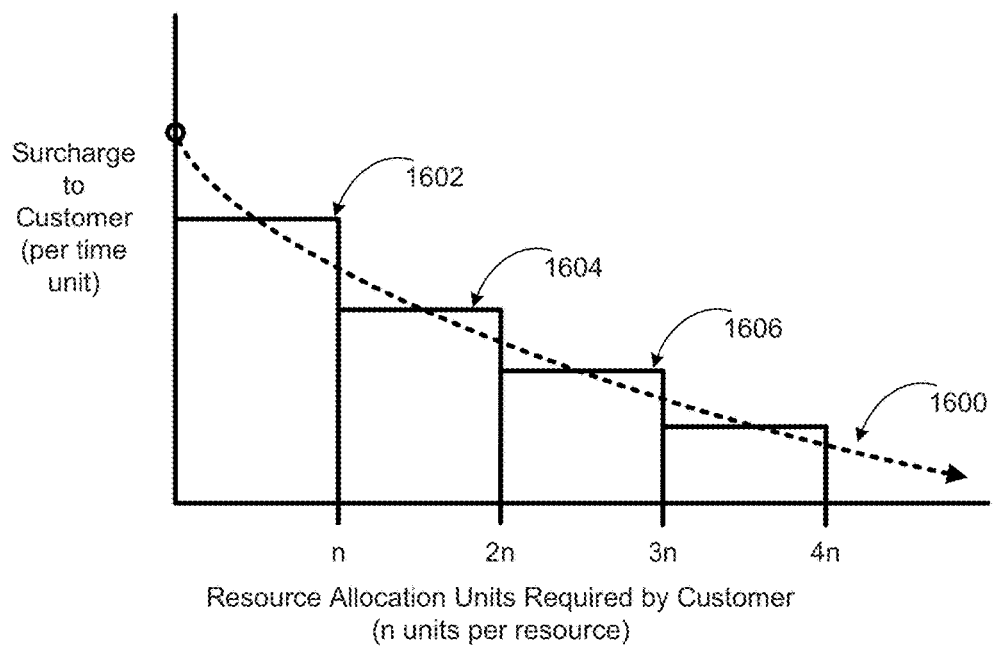
FIG. 16 is a graph illustrating an example of tiered pricing based on a pricing curve in accordance with at least one embodiment.

In various embodiments, surcharge-defining curves, such as those described above, may be used to define pricing tiers, for some suitable definition of tier. Tiers may be defined, for example, based at least in part on a number of resource allocation units used by a customer. In addition, tiers may also be defined for other characteristics, such as for various categories of resource allocation units. FIG. 16 shows a graph that includes a surcharge-defining curve 1600, which may be calculated in a manner similar to that described above and otherwise herein. However, in the example of FIG. 16, the surcharge-defining curve is not directly used to define surcharges for customers, but rather to define pricing tiers for customers. For instance, as shown in FIG. 16, the pricing curve is used to define the height of a set of rectangles having uniform width. The rectangles may be configured such that a midpoint of a top edge of each rectangle intersects the surcharge-defining curve 1600. The rectangles may be configured otherwise based at least in part on the surcharge-defining curve 1600.

The rectangles defined by the surcharge-defining curve may be used to define pricing tiers, with the height of the rectangles defining surcharges. A first rectangle 1602, for example, defines a surcharge for users of one to n resource allocation units. A second rectangle 1604, in this example, defines a lower surcharge for users of (n+1) to 2n resource allocation units. A third rectangle 1606 defines a surcharge for users of (2n+1) to 3n resource allocation units. In this manner customers are provided pricing that is easy to understand. In particular, customers need only need figure out how many resource allocation units they need and see what tier that falls in.

Variations of the tiered pricing model illustrated in FIG. 16 are also considered as being within the scope of the present disclosure. For example, while FIG. 16 shows pricing tiers based on an average number (n) of resource allocation units that can be maintained by an implementation resource, the tiers may be defined by different numbers. For instance, the tiers may be defined by numbers of resource allocation units that are multiples of n, that are fractions of n, or that are multiples of some other number. In addition, while FIG. 16 illustrates tiers of uniform width on the graph shown in the figure, tiers may have other widths.

Figure 17:
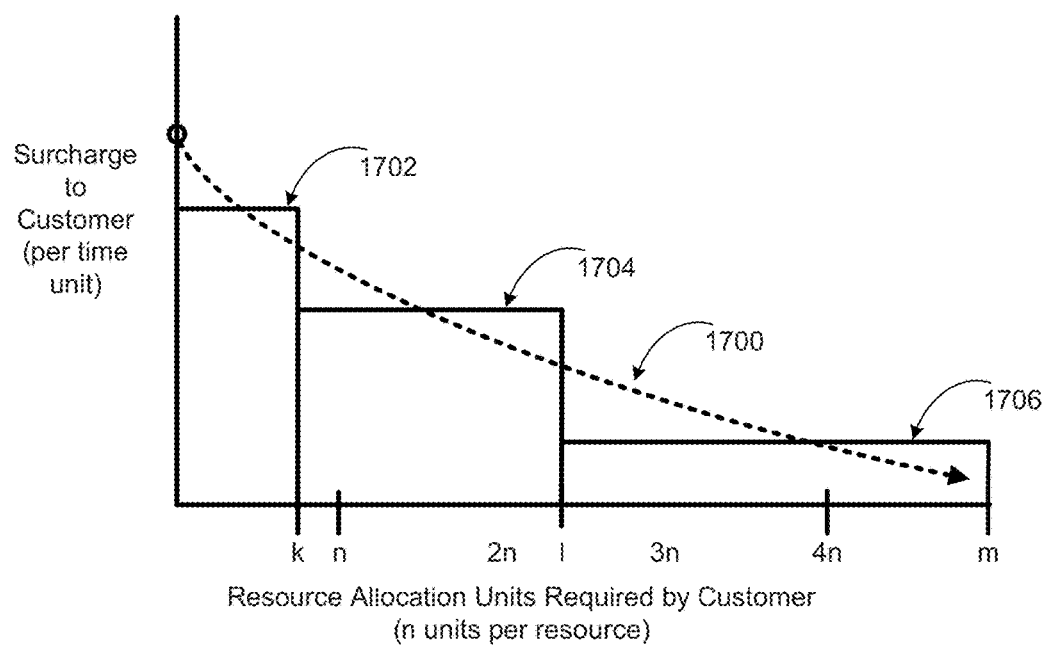
FIG. 17 is a graph illustrating another example of tiered pricing based on a pricing curve in accordance with at least one embodiment.

FIG. 17, for example, shows a graph having a surcharge-defining curve 1700, such as described above. The surcharge-defining curve 1700, as with the surcharge-defining curve 1600 of FIG. 16, may be used to define surcharges for tiers of resource allocation usage of dedicated implementation resources that, on average, are capable of maintaining n resource allocation units. In this example, however, the width of the tiers varies and, in this specific example, the width of the tiers increases as the number of used resource allocation units increases. For example, users of one to k resource allocation units (with k less than n) are charged a first price, as defined by a first rectangle 1702. Users of (k+1) to l resource allocation units (with l between 2n and 3n) are charged a lower surcharge as defined by a second rectangle 1704. Users of (l+1) to m resource allocation units (with m between 4n and 5n) are charged an even lower surcharge. Thus, as the amount of resource allocation units used increases, the tiers in which corresponding usage falls have wider width. Of course, the particular tiers and relative changes among the tiers may vary according to various embodiments. Generally, any suitable definition of tier may be used.

Figure 18:
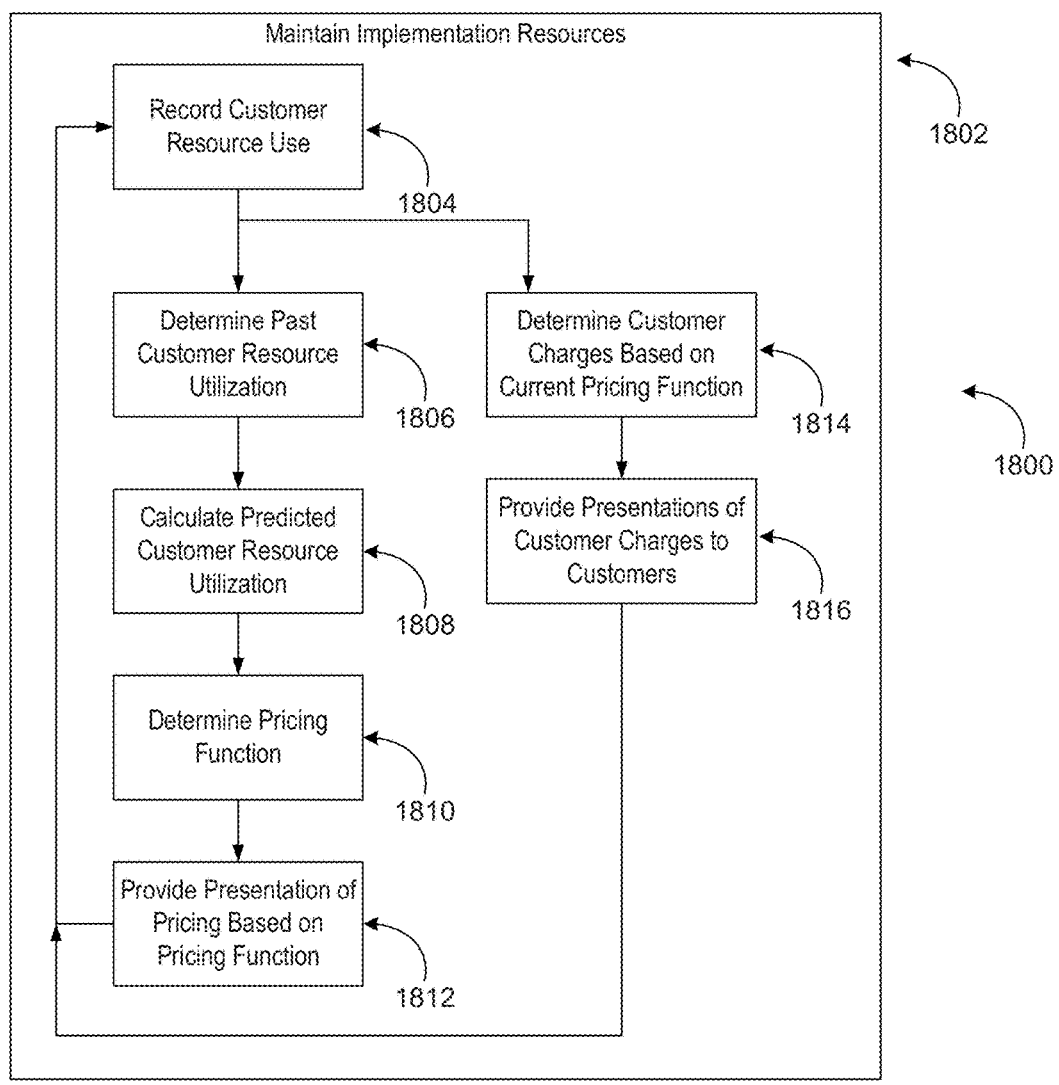
FIG. 18 is a flowchart depicting example steps for tracking costs in accordance with at least one embodiment.

FIG. 18 illustrates an illustrative example of a process 1800 that may be used to account for use of dedicated implementation resources and provide use of dedicated implementation resources accordingly. In an embodiment, the process 1800 includes maintaining 1802 implementation resources, such as of an implementation resource pool. The implementation resources may be maintained as described above, including using at least some of the implementation resources to operate resource allocation units on behalf of one or more customers. As one example, the implementation resources may be VCS servers and the resource allocation units may be virtual computer systems. As illustrated in FIG. 18, the implementation resources may be maintained throughout performance of other actions of the process 1800, as may other actions described in connection with the process 1800, although not necessarily illustrated as such.

In an embodiment, customer resource use is recorded 1804. A virtual resource provider, for example, may use usage logs or other suitable records to maintain information indicating, directly or indirectly, how many resource allocation unit hours per time period (such as a quarter) a customer uses on dedicated implementation resources, for each of a set of customers in a customer base. Various statistics may be calculated and stored. For example, a mean utilization of dedicated resource allocation unit hours may be calculated for various classes of customers and stored accordingly. The classes may be defined, for example, by usage rates during the time period for which customer use is measured. As an illustrative example, a mean dedicated resource allocation unit hour value may be calculated for users that used one to ten dedicated resource allocation unit hours, another mean dedicated resource allocation unit hour value may be calculated for users that used eleven to twenty dedicated resource allocation unit hours, another mean dedicated resource allocation unit hour value may be calculated for users that used twenty one to fifty dedicated resource allocation unit hours, and the like. Of course, different usage rates may be used to define classes of usage for which mean values are calculated, In an embodiment, the process 1800 includes using the recorded customer resource use to determine 1806 past customer resource utilization during a time period for which usage was recorded. Usage logs or other records may be used to determine a value representative of customer usage in a relationship to dedicated, but unused implementation resource capacity. For instance, a ratio of dedicated resource allocation unit hours actually used divided by the total number of resource allocation units available for use (whether used or not) may be calculated. As another example, a total number of resource allocation unit hours used divided by dedicated but unused resource allocation unit hours may be calculated. Separate values for numbers of active and inactive of resource allocation unit hours may be calculated and stored. Generally, any suitable value or set of values may be calculated.

In an embodiment, calculated customer resource utilization is used to calculate 1808 a predicted customer resource utilization in connection with dedicated implementation resources. The predicted customer resource utilization may be equal to calculated past utilization value. The predicted customer resource utilization may also differ from past customer resource utilization. The predicted customer resource utilization may, for example, be larger or smaller than the past customer resource utilization to account for expected increases or decreases in customer usage of dedicated implementation resources.

In an embodiment, the predicted customer resource utilization is used to determine 1810 a pricing function for the use of dedicated resource allocation units for the customer base. The pricing function may, for example, be a function that, when graphed in a manner described above, results in a curve such as one of the curves described above. A pricing function may be, as just one example, $$P(N) = \frac{R}{(aN)^m}$$

where R is a constant, N represents a number of dedicated resource allocation units, and m is a value greater than zero. The pricing function may be a per-hour or other time unit value. This particular pricing function is provided for the purpose of illustration and other functions may be used. In an embodiment, m is one, although the value may differ from one.

Values for R and a may be chosen to influence the shape of the pricing curve. In an embodiment, values for R and a are chosen to satisfy the following equation:

$$\sum_{i=1}^{\infty} i*P(i)*N(i)*C = \sum_{i=1}^{\infty} N(i)(i + U(i))*C.$$

In these equations, P(i) represents a pricing function, such as above. The function N(i) may represent the total expected number of dedicated resource allocation unit hours to be used by customers for exactly i dedicated resource allocation units. For example, N(3) may represent the total number of hours customers are expected to use exactly three dedicated resource allocation units. For example, if N(3) was calculated to be one hundred and twenty four and a total of three customers used exactly three resource allocation units for some time with a first customer having used three resource allocation units for four hours, a second customer having used three resource allocation units for one hundred hours, and the third customer having used three resource allocation units for twenty hours, the expected value for N(3) would have been correct since one hundred and twenty four equals four plus one hundred plus twenty. It should be noted that customers may use resources in a manner that minimizes the amount of lost opportunity to a virtual resource provider, and such use may be accounted for accordingly. For example, a customer's use of resources may be such that the customer uses one dedicated VCS server to maintain one virtual computer system and uses another dedicated VCS server to maintain another virtual computer system. In this manner, the lost opportunity for both dedicated VCS servers may be accounted for.

In addition, it should be noted that N(i) may be zero for some values of i and may be zero for all values of i greater than some threshold. For example, if no customers use exactly one hundred and twenty three resource allocation units, then N(123) may be zero. The value of N(124), however, may not be zero if at least one customer uses exactly one hundred and twenty four resource allocation units. Further, if no user uses a number of resource allocation units that is greater than some value of i, the value of N(i) may be zero for all values of i greater than this value of i. Therefore, while the equation above presents infinite sums, in practice, the sums may be considered as finite sums since N(i) may be non-zero for only a finite number of values of i.

The function U(i) may represent the number of unused resource allocation units when a customer uses i dedicated resource allocation units. For example, if a VCS server is, on average, capable of maintaining four virtual computer systems, U(3) may be equal to one, since using three virtual computer systems results in unused capacity that would be able to maintain one more virtual computer system. In an embodiment, U(i) equals i modulo the average number of resource allocation units corresponding implementation resources each may maintain. For instance, continuing the example of this paragraph, U(i) may equal i modulo four.

The value for C in the equation above may be a standard cost per resource allocation unit charged to customers. While the value C actually cancels out of the above equation, the value is left in for the purpose of illustrating the manner in which the equation is structured. In particular, the left side of the equation represents the actual total amount to be charged to the customer base for use of dedicated resources while the right side of the equation represents the amount that would have been charged to customers had they been charged for used and unused capacity when using dedicated resource allocation units.

Various techniques, including manual trial and error, may be used to determine values for one or more constants in P(i). For example, using the above example for P(i), one of the constants may be set to some number and the other constant may be solved for. The constant may be solved for, for example, by selecting a value for the constant, comparing both sides of the appropriate equation, then, if necessary, adjusting the constant upward or downward as necessary, then comparing the left and right sides of the equation again, and adjusting and repeating if necessary. More sophisticated numerical techniques may also be used. In addition, past values for N(i) may be calculated from usage logs and used as a basis for predicting future use.

In addition, as noted, the functions equations above are provided for the purpose of illustrations and alternate functions and/or equations may be used. Equations may, for example, approximate or assume certain values. As another example, the right side of the equation used to determine one or more constants for P(N) may be value calculated based at least in part on past customer usage of resources and/or dedicated resources. The value may be, for example, a total number of resource allocation unit hours that a virtual resource provider could provide based on capacity multiplied by a standard price per resource allocation unit hour. The value may be a fraction or multiple of such a value. For instance, the value may be calculated to approximate the expected revenue that would be achieved if resources were not able to be dedicated, but not used, that is, if customers were charged only for their use. This value may take into account that, for various reasons including customer demand and allocation for potential customer demand, the virtual resource provider maintains more capacity than actually used. Generally, any cost following method of determining costs to customers that utilize dedicated but unused resources may be used.

In an embodiment, once the pricing function is determined 1810, a presentation of pricing that is based at least in part on the pricing function is provided. Providing a presentation of the pricing may be done in any suitable manner, such as by making a web page with the pricing available, sending an electronic message (such as an email message) with the pricing, making the pricing available via an application programming interface (API) call, or, generally, in any suitable manner. FIG. 20, discussed below, provides an example of a presentation of pricing.

Returning to FIG. 18, as illustrated in the figure, the process 1800, in an embodiment, includes determining 1814 customer charges based on a current pricing function and providing 1816 presentations of customer charges to respective customers. The presentations may be paper or electronic invoices or other documents having information about the customer's usage of resources and corresponding charges.

As noted, pricing functions may be calculated for various categories. The categories may be defined in various ways. For example, categories may be defined by resource type. For example, virtual computer systems may be available in different classes. The classes may vary among an amount of ephemeral memory, platform type (e.g., 32-bit and 64-bit), permanent storage, input/output performance, and/or other characteristics. As discussed above, VCS servers of a virtual resource provider may, on average, be able to maintain a different number of virtual computer systems for each class. Generally, implementation resources may be able to maintain different numbers of resource allocation units for different classes of resources.

Categories may also be defined in different ways, such as according to customer type. For instance, a virtual resource provider may decide to price dedicated resources differently for customers who use the dedicated resources for web hosting than for customers who use dedicated resources for other purposes, such as customers who use dedicated resources for periodic large batches, customers who use dedicated resources for autoscaling, and other types of customers. Generally, any suitable way of defining a category may be used. Accordingly, FIG. 19 shows an illustrative example of a process 1900 that may be used to allow customers to utilize dedicated resources in various categories of resources.

Figure 19:
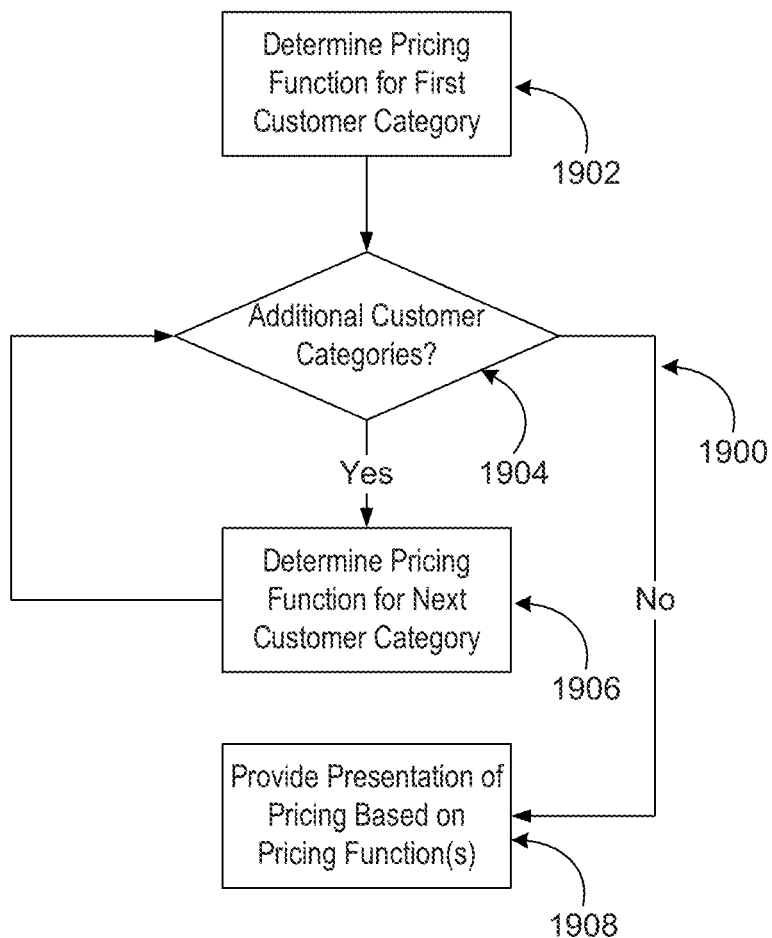
FIG. 19 is a flowchart depicting example steps for tracking costs for one or more categories in accordance with at least one embodiment.

In the process 1900 of FIG. 19, in an embodiment, a pricing function is determined 1902 for a first customer category. The pricing function may be determined in any suitable manner, such as in a manner described above. In an embodiment, the pricing function for the first customer category is determined by using a basis function and using measurements of past customer behavior with respect to the first category to adjust the basis function so that the adjusted basis function may be used to charge customers such that, for the first category, the expected revenue from the customers is expected to be approximately equal to some goal revenue. The goal revenue may be an amount of revenue that would be expected had dedicated but unused capacity of implementation resources been available for use by other customers. Other goal revenues may be used, which may be more than or less than the amount of revenue that would be expected had dedicated but unused capacity of implementation resources been available for use by other customers.

In an embodiment, the process 1900 includes determining 1904 whether there are additional customer categories and, if there are additional customer categories, determining 1906 a pricing function for the next customer category, such as in a manner described above. This process of determining 1904 whether there are additional customer categories and determining 1906 a pricing function for each category may continue until it is determined that there are no additional customer categories. In an embodiment, when pricing functions are determined for all categories, a presentation of pricing based on the determined pricing function(s) is provided, such as in a manner described above.

Variations of the processes described above are considered as being within the scope of the present disclosure. For example, in connection with the process 1900 described in connection with FIG. 19, pricing functions may be determined such that the revenue for a category is not expected to compensate for the inability to use dedicated but unused capacity of implementation resources for other customers, but such that, over all categories, a goal revenue is expected to be achieved. Other variations of the various processes described herein are also considered as being within the scope of the present disclosure. For example, statistical pricing models described herein are, for the purpose of illustration, described in connection with a single type of resource, such as resource allocation units of a certain size. One with skill in the art may adjust the processes described herein so that the pricing models take into account heterogeneous groups of resources, such as fleets of different size virtual computer systems. In addition, in various embodiments, a custom pricing function is calculated based at least in part on a customer's usage.

As noted above, FIG. 20 provides an illustrative example of a presentation of pricing information generated in accordance with the various embodiments described herein. In this particular example, the presentation is in the form of information on a web page 2000 that is accessible to customers (and, in an embodiment, potential customers) of a virtual resource provider. In this example, pricing is shown for various categories of virtual resources and, in particular, various categories of virtual computer systems (instances). For instance, a first table 2002 shows pricing for various categories of virtual computer systems. In this example, a small standard dedicated instance may correspond to a single resource allocation unit, a medium standard dedicated instance may correspond to a higher number of resource allocation unit, and a large standard dedicated instance. Prices for the various categories of instances may be priced in a manner such as described above. In this example, prices depend not only on the category of resource, but on other factors, such as the operating system used for the virtual computer systems, a geographic region in which the implementation resources for the virtual computer systems are located, and the like.

Also shown in FIG. 20 is pricing for other categories of virtual computer systems. The pricing may have been determined in accordance with the various embodiments described herein. The various prices shown may be, for instance, prices that include per-hour charges for use of resources plus a surcharge calculated in accordance with the various embodiment. In addition, pricing for various "sizes" of super dedicated instances are shown in a second table 2004. A super dedicated instance of a certain size may be similar to a standard dedicated instance of the same size, but may have better performance in one or more respects. For example, input/output may be faster, there may be more ephemeral or permanent memory, and the like. Also shown in FIG. 20 are other tables for other categories of virtual computer systems and, while not illustrated, tables for groups (such as clusters or networks) of virtual computer systems may be provided and pricing may be determined in accordance with the various embodiments described herein.

FIG. 20 provides an illustrative example of a presentation of pricing information generated in accordance with the various embodiments described herein. In this example, as with FIG. 20, the presentation is in the form of information on a web page 2100, but could be in other forms. The web page 2100, as shown in FIG. 21, includes a plurality of tables which are configured similarly to the tables, including a first table 2102 and a second table 2104. The first table 2102 and the second table 2104 may be similar to the tables 2002, 2004 shown in FIG. 20. However, in FIG. 21, a total price per instance is shown with a base price per instance plus a surcharge per instance. For example, a customer may look at the first row in the first table 2102 to see that by ordering small standard instances on dedication implementation resources, the customer will be required to pay $0.25 per instance per hour (which may be a standard price for the small standard instance) plus a surcharge of $0.86 per instance per hour. In this manner, customers and potential customers are able to conveniently see the effect of using dedicated resources on the price per resource and can make decisions on resource use accordingly.

FIG. 22 also provides an illustrative example of a presentation that is in the form of a web page 2200. The web page 2200, in this example, is in many ways similar to the web pages 2000 and 2100 described above in connection with FIGS. 20 and 21. In FIG. 22, however, surcharge amounts are shown for a plurality of tiers where each tier is based on a number of instances used by a customer. For example, as shown in the figure, the web page 2200 includes a first table 2202 which indicates to the user that, should the user utilize between one and ten instances, the user will pay $1.24 per instance per hour. Similarly, for the next one hundred instances used by the user, the user will be charged $0.99 per instance per hour. Therefore, in this example, if the user uses ninety instances, the user may be charged $1.24 per instance per hour for ten of the instances and $0.99 per instance per hour for the remaining eighty instances. As shown in the figure, the surcharge amount decreases as the numbers of instances to which each tier corresponds increases, in accordance with an embodiment. As shown in FIG. 22, another table 2204 for another category of instance (Small Super Dedicated) is configured similarly to the first table 2202, with per-instance-per-hour surcharges displayed accordingly.

Variations of the presentations shown in FIGS. 20-22 are considered as being within the scope of the present disclosure. For example, FIG. 22 shows a progressive system of tiers where the customer may pay different amounts for some dedicated instances than for other instances. For instance, as noted, if a customer uses between ten and one hundred instances, the customer may pay one price for some of its instances and another price for others of its instances. The tiers may be structured in other ways. For example, the tiers may be structured such that a number of instances used by the customer determines a per-instance-per-hour surcharge for all of the customer's dedicated instances. A customer whose usage of dedicated instances falls in one tier, for instance, may pay one price for each of the customer's instances while another customer whose usage of dedicated instances falls into another tier may pay a single per-instance-per-hour price for each of the customer's instances. In other words, in this example, each customer pays a single price for each instance and not one price for some of the instances and another price for other instances.

Other variations are also considered as being within the scope of the present disclosure. For example, the specific values and tier definitions illustrated in the figure are for the purpose of illustration and other values and tier definitions may be used in various embodiments. Similarly, the specific use of tables to show pricing is also for the purpose of illustration and other ways of presenting information may be used.

In some embodiments, surcharges or other charges for use of dedicated resources are calculated for different bases. For example, instead of or in addition to surcharges based at least in part on a quantity of dedicated resources required by a customer, surcharges may be based at least in part on groups of implementation resources among which implementation resources of a virtual resource provider are allocated. The groups may be geographically or otherwise separated from one another. In one embodiment, implementation resources of a virtual resource provider are grouped according to a plurality of data zones. A data zone may correspond to one or more data centers, such as one or more data centers in a geographic region. Data zones may also correspond to other partitions of implementation resources, such as portions (rooms, e.g.) of a data center. A virtual resource provider may maintain implementation resources in multiple data zones. Also, one or more geographic regions may each correspond to multiple data zones. Surcharges for use of dedicated resources may be based at least in part on a data zone in which the use occurs.

A customer may be charged, for example, a standard rate for use of a required number of dedicated resources plus a surcharge for every data zone in which the customer requires dedicated resources. The surcharge per data zone may vary among the data zones or may be the same across all data zones. The standard rate may correspond to a rate for un-dedicated resources (resources that may be maintained with resources of one or more other customers using common implementation resources) or may be a standard rate for dedicated resources that is higher than the standard rate for un-dedicated resources. For each data zone, the per-data zone surcharge may be determined for various tiers of customer use which may correspond to numbers of resource allocation units. Additional surcharges may also be determined and applied. The surcharges may be calculated so that, over a base of customers, the surcharges are expected to be cost following by compensating the virtual resource provider for dedicated capacity of implementation resources that is not able to be used to serve other customers. If multiple surcharges are used, the surcharges may be calculated to collectively compensate for the dedicated capacity that is unable to be used for other customers.

Surcharges may also be calculated for other categories of customer use of dedicated resources. Surcharges may be calculated for use of dedicated resources in various geographic regions, which may correspond to geopolitical boundaries. A customer may be charged a standard rate for dedicated resources plus a surcharge for every geographic region in which the customer requires dedicated resources. As with other surcharges discussed above, surcharges for use of dedicated resources in various geographic regions may be calculated to be cost following to compensate for dedicated but unused capacity of implementation resources that a virtual resource provider refrains from using to serve other customers. Generally, one or more surcharges may be calculated for any category of customer use such that, for a base of customers, applied surcharges are expected to compensate, at least partially, for revenue that a virtual resource provider foregoes by dedicating available capacity of implementation resources to specific customers while not using unused portions of the dedicated capacity to serve other customers. As with data zones, surcharges for geographic regions may vary among the geographic regions, or may be a the same across all geographic regions.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

For the Examiner's convenience, Applicants note that this application is a divisional of U.S. application Ser. No. 13/045,200. The claims of the present application are different and possibly, at least in some aspects, broader in scope than the claims pursued in the parent application. To the extent any prior amendments or characterizations of the scope of any claim of the parent or any cited documents could be construed as a disclaimer of any subject matter supported by the present disclosure, Applicants hereby rescind and retract such disclaimer. Accordingly, the references previously presented in the parent applications may need to be revisited.

What is claimed is:

1. A computer-implemented method, comprising:
managing, for a plurality of customers of a virtual resource provider, one or more dedicated server pools associated with a plurality of servers, the plurality of servers individually being configured to host a plurality of virtual machines, the one or more dedicated server pools being managed by enforcing a permitted virtual resource density corresponding to an allowable number of virtual machines permitted to be hosted by a server of the one or more dedicated server pools;
recording, for the plurality of customers of the virtual resource provider, usage of one or more dedicated virtual machines that are hosted exclusively for a customer by a set of servers of the plurality of servers, the usage of the one or more dedicated virtual machines being recorded in increments of resource allocation units, the resource allocation units corresponding to a single dedicated virtual machine and a unit of time;
determining, based at least in part on the recorded usage, a pricing function, the pricing function configured to be used to charge customers for use of the one or more dedicated virtual machines in a manner compensating for the virtual resource provider's inability to use dedicated but unused capacity of the plurality of servers to host at least some of the plurality of virtual machines for other customers, the pricing function configured to:
receive input values corresponding to a number of the resource allocation units corresponding to the usage; and
provide a corresponding non-linear output; and
making available, to at least the plurality of customers, a presentation of a pricing scheme that is based at least in part on the pricing function.

2. The computer-implemented method of claim 1, wherein the pricing scheme includes a plurality of pricing tiers, each pricing tier of the plurality of pricing tiers being based at least in part on a number of the one or more dedicated virtual machines.

3. The computer-implemented method of claim 1, wherein the pricing function is a function of at least a quantity of the resource allocation units, and wherein the pricing function is configured such that, for at least a plurality of consecutive possible inputs to the pricing function, the pricing function decreases.

4. The computer-implemented method of claim 1, wherein the plurality of servers are grouped according to a plurality of groups, and wherein the pricing scheme is configured such that charges for a set of the one or more dedicated virtual machines depend at least in part on customer configurations for allocation of members of the set among one or more of the groups.

5. The computer-implemented method of claim 4, wherein the groups are geographically apart from one another.

6. A computer-implemented method for virtual resource cost tracking, comprising:
managing, for a plurality of customers of a virtual resource provider, one or more dedicated server pools associated with a plurality of servers, the plurality of servers individually being configured to host a plurality of virtual machines, the one or more dedicated server pools being managed by enforcing a permitted virtual resource density corresponding to an allowable number of virtual machines permitted to be hosted by a server of the one or more dedicated server pools;
maintaining, for at least one customer of the virtual resource provider, at least one dedicated virtual machine that is hosted exclusively for the at least one customer by at least one server of the plurality of servers, the at least one dedicated virtual machine being provided by the at least one server in increments of resource allocation units, the resource allocation units corresponding to a single dedicated virtual machine and a unit of time;

determining, based at least in part on a pricing function, a charge for maintaining the at least one dedicated virtual machine for the at least one customer, the pricing function being configured to:

receive input values corresponding a number of the resource allocation units; and provide a corresponding non-linear output corresponding to a usage of the dedicated virtual machine by the at least one customer; and providing, to the at least one customer, a presentation that indicates the determined charge.

7. The computer-implemented method of claim 6, wherein the pricing function is based at least in part on past customer usage by the plurality of customers of dedicated virtual machines that are implemented using the plurality of servers that are each used exclusively for a corresponding customer.

8. The computer-implemented method of claim 6, wherein the pricing function is determined such that, for the plurality of customers to be charged based at least in part on the pricing function, an expected revenue from the plurality of customers approximates a revenue goal.

9. The computer-implemented method of claim 8, wherein the revenue goal is determined based at least in part on unused capacity of the plurality of servers dedicated to exclusive customer use.

10. A computer system, comprising:

one or more processors; and memory including executable instructions that, when executed by the one or more processors, cause the computer system to at least:

manage, for a plurality of customers of a virtual resource provider, one or more dedicated server pools associated with a plurality of servers, the plurality of servers individually being configured to host a plurality of virtual machines, the one or more dedicated server pools being managed by enforcing a permitted virtual resource density corresponding to an allowable number of virtual machines permitted to be hosted by a server of the one or more dedicated server pools;

record, for the plurality of customers of the virtual resource provider, usage of dedicated virtual machines, the dedicated virtual machines being hosted exclusively for a customer by a set of servers of the plurality of servers, the usage of the dedicated virtual machines being recorded in increments of resource allocation units, the resource allocation units corresponding to a single virtual machine and a unit of time;

determine, based at least in part on the recorded usage, a pricing function, the pricing function configured to be used to charge customers for use of dedicated virtual machines in a manner compensating for the virtual resource provider's inability to use dedicated but unused capacity of the plurality of servers to host virtual machines for other customers, the pricing function configured to:

receive input values corresponding to the number of the resource allocation units corresponding to the usage; and provide a corresponding non-linear output; and make available, to at least the plurality of customers, a presentation of a pricing scheme that is based at least in part on the pricing function.

11. The system of claim 10, wherein the pricing scheme includes a plurality of pricing tiers, each pricing tier of the plurality of pricing tiers being based at least in part on a number of dedicated virtual machines.

12. The system of claim 10, wherein the pricing function is a function of at least a quantity of the resource allocation units, and wherein the pricing function is configured such that, for at least a plurality of consecutive possible inputs to the pricing function, the pricing function decreases.

13. The system of claim 10, wherein the plurality of servers are grouped according to a plurality of groups, and wherein the pricing scheme is configured such that charges for a set of dedicated virtual machines depend at least in part on customer requirements for allocation of members of the set among one or more of the groups.

14. The system of claim 13, wherein the groups are geographically apart from one another.

15. One or more computer-readable storage media having collectively stored thereon instructions that, when executed by one or more processors of a computer system, cause the computer system to at least:

manage, for a plurality of customers of a virtual resource provider, one or more dedicated server pools associated with a plurality of servers, the plurality of servers individually being configured to host a plurality of virtual machines, the one or more dedicated server pools being managed by enforcing a permitted virtual resource density corresponding to an allowable number of virtual machines permitted to be hosted by a server of the one or more dedicated server pools;

maintain, for at least one customer of the virtual resource provider, at least one dedicated virtual machine that is hosted exclusively for the at least one customer by at least one server of the plurality of servers, the dedicated virtual machines being provided by the at least one server in increments of resource allocation units, the resource allocation units corresponding to a single dedicated virtual machine and a unit of time;

determine, based at least in part on a pricing function, a charge for maintaining the at least one dedicated virtual machine for the at least one customer, the pricing function being configured to:

receive input values corresponding a number of the resource allocation units; and provide a corresponding non-linear output corresponding to a usage of the dedicated virtual machine by the at least one customer; and providing, to the at least one customer, a presentation that indicates the determined charge.

16. The one or more computer-readable storage media of claim 15, wherein the pricing function is based at least in part on past customer usage by the plurality of customers of virtual machines that are implemented using the plurality of servers that are each used exclusively for a corresponding customer.

17. The one or more computer-readable storage media of claim 15, wherein the pricing function is determined such that, for the plurality of customers to be charged based at least in part on the pricing function, an expected revenue from the plurality of customers approximates a revenue goal.

18. The one or more computer-readable storage media of claim 15, wherein the revenue goal is determined based at least in part on unused capacity of the plurality of servers dedicated to exclusive customer use.

\* \* \* \* \*